(12) United States Patent
Zager et al.

(10) Patent No.: US 7,413,085 B2
(45) Date of Patent: Aug. 19, 2008

(54) TECHNIQUES FOR DISPLAYING EMAILS LISTED IN AN EMAIL INBOX

(75) Inventors: Robert Philip Zager, Saratoga, CA (US); William Ames, San Jose, CA (US); Jose Jesus Picazo, Jr., Los Gatos, CA (US); Nageshwara Rao Vempaty, Palo Alto, CA (US); Vikram Duvvoori, Salinas, CA (US); Chris David Trytten, Sunnyvale, CA (US)

(73) Assignee: Iconix, Inc., Santa Clara ( * ) Notice: Subject to any disclaimer, the term of this patent is extended or adjusted under 35 U.S.C. 154(b) by 715 days.

(21) Appl. No.: 10/935,260

(22) Filed: Sep. 7, 2004

(65) Prior Publication Data

US 2006/0053293 A1 Mar. 9, 2006

(51) Int. Cl.
*G06F 13/00* (2006.01)
(52) U.S. Cl. ...................................................... 209/206
(58) Field of Classification Search .................. 709/206
See application file for complete search history.

(56) References Cited

U.S. PATENT DOCUMENTS

| 6,587,550 | B2* | 7/2003 | Council et al. | 379/100.08 |
| 2004/0148242 | A1 | 7/2004 | Fleishman | |
| 2005/0044153 | A1* | 2/2005 | Gross | 709/206 |
| 2006/0041505 | A1* | 2/2006 | Enyart | 705/40 |
| 2006/0075027 | A1 | 4/2006 | Zager et al. | |
| 2006/0075028 | A1 | 4/2006 | Zager et al. | |

OTHER PUBLICATIONS

"U.S. Appl. No. 10/935,337, Response filed Apr. 7, 2008 to Non-Final Office Action mailed Jan. 7, 2008", 22 pgs.
"U.S. Appl. No. 10/935,337, Non-Final Office Action mailed Jan. 7, 2008", 5 pgs.
"U.S. Appl. No. 10/935,639, Response filed Apr. 7, 2008 to Non-Final Office Action mailed Jan. 7, 2008", 30 pgs.
"U.S. Appl. No. 10/935,639, Non-Final Office Action mailed Jan. 7, 2008", 5 pgs.

* cited by examiner

*Primary Examiner*—Robert B Harrell
(74) *Attorney, Agent, or Firm*—Schwegman, Lundberg & Woessner, P.A.

(57) ABSTRACT

A protocol for protected email transmission using micropayments and a segregated inbox in which protected emails are displayed. The protocol also involves authentication of the sender to defeat phishers and an opt out protocol which can be used to block protected emails from sources from which the user no longer wishes to receive emails even if the source has made a micropayment. Branded email is also taught wherein a sender of protected emails can pay extra to have a miniature version of its brand logo or trademark displayed with its email in the segregated inbox. A white list is maintained on the protected email server (along with the opt out black list) so that recipients can designate specific senders who may send email to that recipient without paying a micropayment and still have the protected email displayed in the segregated inbox.

17 Claims, 15 Drawing Sheets

| EXSIS – MICROSOFT OUTLOOK | | | | | | | |
|---|---|---|---|---|---|---|---|
| FILE | EDIT | VIEW | GO | TOOLS | ACTIONS | HELP | |
| ✉ NEW | ✉ | | ✉ REPLY | REPLY ALL | FORWARD | • • • | |

| MAIL | EXSIS | | |
|---|---|---|---|
| | ! ☐ ✉ | | |
| ☐ INBOX | ▣ DATE : TODAY | | |
| ☐ UNREAD MAIL | FROM | SUBJECT | RECEIVED |
| ☐ FOR FOLLOW UP | 📄 CFO —96 | CFO.COM | CFO EVENTS | MON 6/10/2004 |
| ☐ SENT MAIL | 📄 AMAZON | SHIPPING@AMAZON | YOUR ORDER | MON 6/10/2004 |
| ☐ DELETED MAIL | 📄 BOBBY ~98 | BOBBY | HI! | |
| ALL MAIL FOLDERS | | | |
| ☐ OPEN FOLDERS | 📄 CNN | CNN.COM | AL QAEDA SUSPECT • • • | MON 6/10/2004 |
| ☐ EXSIS —90 | ▣ DATE : YESTERDAY | | |
| ☐ PHIL'S EMAIL | 📄 CFO | CFO.COM | TODAY IN FINANCE | SUN 5/9/04 |
| | 📄 ◈ | REUTERS | MAY 10, 2004 KRISPY • • • | SUN 5/9/04 |
| 94 | | • • • | |

| TRANSACTION NUMBER 167 | ENCRYPTION KEY 169 | SENDER ID 171 | ENCRYPTED VERSION OF STEMP 173 | ASSOCIATED SOURCE ICON 175 |
|---|---|---|---|---|
| ABC3679 | #IAC3X | FED EX | 97CF3A8XY | FED EX TRUEMARK™ |
| DFG4769 | 43XZ32B | BOBBY WHITE | 83AX9CG42 | WHITE LIST ICON |
| ••• | ••• | ••• | ••• | ••• |

TECHNIQUES FOR DISPLAYING EMAILS LISTED IN AN EMAIL INBOX

RELATED APPLICATIONS

The present Application is related to the following pending United States Patent Applications: 1) Ser. No. 10/935,639; Publication Number 20060053293 filed on Sep. 7, 2004; and entitled: "User Interface and Anti-Phishing Functions for an Anti-Spam Micropayments System;" 2) Ser. No. 10/935,337; Publication Number 20060075027 filed on Sep. 7, 2004; and entitled: "User Interface and Anti-Phishing Functions for an Anti-Spam Micropayments System;" and 3) Ser. No. 10/935,639; Publication Number 20060075028 filed on Sep. 7, 2004; and entitled: "User Interface and Anti-Phishing Functions for an Anti-Spam Micropayments System."

BACKGROUND OF THE INVENTION

Unsolicited email is becoming a large problem on the internet. One solution to this problem is the use of a micropayments system where emails from sources not on a recipient's white list do not get to recipients unless the sender has taken steps to make a small payment called a micropayment. Emails for which micropayments have been made include in them coding which is called a stemp and which indicates the micropayment has been made. One such micropayments system is disclosed in U.S. patent application METHOD AND APPARATUS FOR IMPLEMENTING A MICROPAYMENT SYSTEM TO CONTROL E-MAIL SPAM, filed Feb. 12, 2004, Ser. No. 10/778,956 as assigned to the assignee of the present invention.

While that patent application describes the details of how a micropayments server cooperates with client computer executing sending and receiving processes, it did not go into a user interface for interacting with users regarding the presence or absence of stemps on incoming emails or the issue of phishing.

Micropayments are effective to stop mass emailers who send out millions or tens of millions of unsolicited emails per day to users who do not want to receive them. Even a payment of 0.01 cents per email will be a considerable amount of money when multiplied by millions of emails per day. However, bulk emailing of unsolicited emails is not the only problem the internet suffers from.

Phishing has become a large problem in email communications over the internet. Phishing involves passing oneself off as a legitimate business from which a user may actually want to receive unsolicited emails. In September 2003, the number of phishing attacks was 279. By March 2004, the number of phishing attacks had risen to 215,643. Spam only gets a response rate of 0.01%. However, phishing, because of the air of legitimacy and the strong call to action, gets a 5% response rate.

Phishing is done with email messages which look very similar or identical to email messages that come from the legitimate business and contain an urgent call to action with a request to click on a link. Clicking on the link takes the unsuspecting user to the phisher's web page where personal information such as credit card numbers or bank account numbers are sought. If the user supplies the information, an identity theft often follows. For example, a favorite recent ploy of phishers is to send an email to a customer pretending to be from the user's credit card company. The email says typically, that a charge for a kiddie pornography purchase is about to show up on the user's credit card statement and requesting the user to click on a link if the user wishes the cancel the charge. When the user clicks on the link, his browser is directed to a web page which actually is being run by the phisher but which appears to be run by the credit card company. The user is then asked to enter his credit card number to verify he wants to stop the charge. Many user's do not recognize the fact that the sender of the original email would already have his credit card number if the email was actually sent by the credit card company it purports to have been sent from. Another favorite recent ploy is to send an email to people who are looking for a job, the email apparently being from careerbuilder.com. The emails says the job seeker has a job offer and invites her to click on a link to learn more about the offer. Clicking on the link takes the job seeker to a page apparently offered by careerbuilder.com which describes an offer and asks for their credit card number to pay the fee of careerbuilder.com and asks for employee identification information such as social security number and date of birth to complete mandatory government forms such as W-2's and I-9's. The fee goes to the phisher, the job offer is totally fictitious, and the identity data is used for identity theft.

Another possible vunerability to phishers is practiced in Europe. There, banks offer a service to send short message service warnings to customers cell phones when their balance gets low. If the phishers can think of a way to abuse this system, they will.

Phishers have been achieving as high as about 5% click through rate on these type ploys and have been stealing a large amount of sensitive information.

Phishers can do all this by downloading into the user's browser "JAVA®." applets which paint the display to make it look like the solicitation is coming from the legitimate business. Phishers can even hijack the URL bar where user's enter URLs to direct their browsers to a desired web page. When the user clicks on a link provided by the phisher, the address bar of the browser for that session is hijacked so no matter what URL the user types in, the browser will be directed to a web page offered by the phisher. For example, the user may click on a link that he things will take him to www.amazon.com but which is actually provided by the phisher, and a "JAVA®." applet downloaded into the browser hijacks the user's address bar. Whatever the user types in the address bar will take him nowhere but to a web page supplied by the phisher. There, the phisher displays a web page that looks very similar or identical to the business which the user thinks he is visiting. This user may think she is buying something from or supplying information to Amazon.com needed to correct some problem with the user's account but in reality, the payment or information goes to the phisher and not to the legitimate business to which the consumer thinks the payment is going.

Naturally this ability to cause a user's browser to display a page which looks like it is being offered by a legitimate business can and currently is leading to abusive practices which micropayment systems cannot stop. For example, when the phisher is only sending out a few thousand emails to a targeted list of consumers in the hope of getting just a small percentage of those users to respond, a small micropayment, even if paid, is not much of a deterrent. Micropayments will not stop phishers since they do not send out millions of emails every day. Their volume is much lower because they can use targeted email lists.

There are two kinds of phishing today. The first uses a long URL to obscure the criminal's actual domain name. The second, called social phishing, uses perfectly legitimate domain name registrations, which can be purchased for as low as $8.95 from some sources but which include a famous trademark of another company. For example, there are twenty five imposter, but perfectly legitimate domain name registrations using the trademark "VIAGRA®." For example, there is a registration to www.viagra-generic.com. "PHIZER®." the legitimate owner of the "VIAGRA®." trademark, does not own nor is it associated with any of these websites. For an extra $49.95, each one of these imposters can obtain a perfectly legitimate 128 bit certificate that will lock the lock on the browser and support digital signatures. Technical means cannot detect these perfectly legitimate URLs. Further, since the "MICROSOFT®/YAHOO®." Sender ID scheme only checks for the authenticity of the top level domain, and all these imposters have legitimate top level domains, this prior art authentication scheme will not work to protect a recipient of an email from one of these domains from being confused into believing the email is from "Phizer®." A way to protect users from these social phishers is needed.

Eventually, micropayment-based email may become the dominant form of email traffic on the internet. In addition to the phishing problem, it is annoying to have commercial unsolicited email mixed in with email from friends and family.

In order to fight spam and phishing, email filters are getting tighter. Filters now block up to 50% of permission based marketing e-mails. Legitimate advertisers still need to get their messages through however.

Email presents four challenges to commercial senders.
1. Filters: Filters now block up to 50% of commerical email for some service providers. eTrust is working to solve this. Jupiter says it will get worse.
2. Phishing: The problem with phishing has been discussed above. For email marketing, this is a huge problem. Filter providers say they can fix this problem, but the reality is they cannot. With a 5% response rate, volumes do not have to approach the spam volume levels that trigger filters. The identification of this material is too content specific to be subject to computerized solutions. Technical solutions probably will not work, because clever criminals find ways around such solutions, and technical solutions would have to find universal acceptance which is difficult to achieve.
3. Clutter: When the world is perfect and only permission based email gets in your inbox, the volume of permission based email is growing. Marketers need a way to break out of the clutter. Jupiter says this will get worse.
4. Opt-outs: As legitimate companies get mailing lists from numerous sources and use numerous outside agencies to send email, opting out becomes very hard for the senders of commerical email marketing messages to administer. A way to take this burden off them is needed, and is provided by this invention.

Commercial companies which are legitimate and who want to use the internet to send messages using their logo are bothered by all the above noted problems. In the prior art, "AOL®." has been using their logo in their webmail to distinguish their own email. They do it in their "type" column. "AOL®." claims this is secure so that you know for sure this email came from them. But this has not, as far as the applicants are aware, been generalized into a simple general purpose graphical display of verifiable sender identity. Also, it appears to lack the validation feature provided by the invention described herein. A phisher could overwrite this screen and spoof the "AOL®." logo.

Passmark has a rather complex system that attempts to provide sender validation. What is needed however is a general way to associate security with visualization for email. "Visualization" is more general than simply a picture. It could include a sound note.

Therefore, a need has arisen for a user interface which segregates out paid email from unpaid email and for a micropayments system with antiphishing functionality which authenticates the sources of each paid email so that a user knows from whom each email received actually came. A need has also arisen for a system which provides legitimate marketers the ability to use email in a sheltered, safe environment to deliver legitimate messages to their existing customers and prospective customers. A way to send branded email with logos encrypted with the identity of the sender is also needed to allow commercial marketing messages to be sent by protected email which gets segregated into a separate inbox at the recipient and which uses the valuable and trusted logo of the sender and which the recipient knows is already authenticated when it arrives or which the recipient can authenticate by giving a command on his computer is also needed.

SUMMARY OF THE INVENTION

A user interface is disclosed that segregates Exsis email from other email. Exsis email is email which contains in its header data in the form of a code embodying or linked to a source icon displayed with the email and indicating a micropayment has been made and indicating the source of the email or that the email is from a sender on the white list of the recipient. The display can be on a computer, cell phone, PCS device, "BLACKBERRY®." or other wireless device. Such an email sent from a white list recipient or after a micropayment has been made is referred to in the claims as a protected email because its source is automatically authenticated or individual protected emails can be manually authenticated as to the source, and because it is segregated into a separate Exsis inbox which is different from the regular inbox in which all other non protected emails are stored. All other non paid emails are displayed in the content pane which is displayed when the regular inbox icon in a navigation pane is selected. Exsis email is displayed when an Exsis inbox or folder icon displayed in the navigation pane is selected.

The source icon mentioned above indicating a micropayment has been made or the emails is from a white list recipient and that the email has already been automatically authenticated by the Exsis server, or that it can be authenticated by the user by requesting that the email be authenticated and following a predetermined protocol described herein. The source icon takes the form of a Truemark or generic logo or a white list logo (hereafter just referred to as a source icon) and its presence indicates a stemp is in the header of the protected email. A stemp is provided by the protected email server to a sender who requests it after the sender is validated and either a micropayment has been made or the validated sender is found to be on the white list of the intended recipient, meaning he or she is a person who has been designated by the sender to send email to the recipient for free and still have it segregated into the Exsis inbox.

In the preferred embodiment, the indication of who an authentic email bearing a stemp is from is given in the form of a Truemark icon which is a miniature replica of the Trademark of the company or person that sent the email. Truemarks are displayed only when the sender has paid extra to have its company trademark displayed as the source icon. The Truemark can be stored in the recipient computer in some embodiments or, in other embodiments, is downloaded from a server such as the authentication server or the Exsis server (called the protected email server or the secure micropayment server in the claims). An example of such a Truemark icon indicating the authentic source of the email is shown at 74 in pane 48 in FIG. 3. This particular email is from Amazon.com, and the fact that the Truemark icon at 74 is displayed at all is a representation to the recipient that the email has been authenticated in the manner described below and is actually from Amazon.com (in some embodiments, the Truemark is displayed on all these "premium" type incoming protected emails even if they have not already been automatically authenticated, because the user knows that the Truemark can be authenticated using the manual procedures described herein). If an email is from a sender who has made a micropayment, but has not paid extra to have its company logo displayed as the source icon, a generic logo is displayed as the source icon after the sender has been authenticated. If an email is from a white list recipient who does not have a Truemark, the icon displayed after authentication can be a white list icon provided for free by the assignee. In other embodiments, white list icons can be anything the recipient configures in his address book such as a miniature digital photo of the person, their name or a nickname.

The source icons provide an easy way for a recipient to visually prioritize the protected email in terms of what to open first because the different types of source icons indicate whether an email is from a friend or family member (usually the highest priority in the recipient's eyes), from a company who paid extra to get their message segregated into the recipient's Exsis inbox and have their company logo displayed as the source icon (a Truemark), or somebody who just wanted their message segregated into the Exsis inbox to be away from the other spam (generic logo).

In some embodiments, the white list and paid emails are displayed simultaneously interspersed in a single content pane when the Exsis inbox icon in the navigation pane is selected. In another embodiment, when the Exsis inbox icon is selected, a content pane with friends and logomail tabs is displayed. When the friends tab is selected, only Exsis email from senders on the white list of recipient are displayed. When the logo mail tab is selected, only paid Exsis email is displayed. In another embodiment, when said Exsis inbox icon is selected, a split content pane is displayed. All Exsis email is displayed in the split content pane with paid emails being displayed in one portion of said content pane and white list emails being displayed in another portion of said content pane.

Also disclosed is an antiphishing method and apparatus for authenticating the sender of Exsis emails using information from the header of the email or supplied by the sender such as the Exsis account number and/or the user name and password assigned to the sender when the sender set up a micropayments account. In some embodiments, this authentication is done automatically when the sender sends an initiation message to the protected email server requesting a stemp and supplying the user name and password (encrypted) or Exsis account number (encrypted). In the preferred embodiment, the Exsis email is not displayed in the Exsis inbox if it has not been authenticated. This authentication process solves the problem of the social phishers who are trying to confuse recipients of emails from them by using legitimate domain name registrations having somebody else's famous trademark therein such as www.viagra-generic.com. Because these social phishers will not have the user name and password or Exsis account number of "PHIZER®." in their initiation messages to the Exsis server requesting a stemp, their emails will not be authenticated and will not show up as being from "PHIZER®."

An advantage of authenticating the Exsis account number instead of the IP address is that outsourcing email sending functions to authorized third parties can be performed by a customer of the protected email system. Because the authorized third parties will have the legitimate user name and password or account of "PHIZER®." or Wells Fargo, for example, they can send protected emails and they will show up in the Exsis inbox of the recipients with the Truemark of "PHIZER®." or Wells Fargo, as the case may be.

Contrast this with the Sender ID authentication schemes. If "WELLS FARGO®." used "TOPICA®." as an email distribution house for Wells Fargo, the "TOPICA®. "Sender ID would be used and not that of "WELLS FARGO®."Sender ID does not advance brand identity—only IP identity. The Sender ID is also unrefined in the sense that it cannot easily support an opt out protocol as can be performed in the invention since in the Sender ID scheme, the client would have to coordinate all the opt-out lists for all of its email distribution houses.

In earlier micropayments systems, there were multiple ways to get email through: micropayments; whitelist; challenge/response; and screenscapes (if you order something, the company you ordered from is added to the whitelist so that subsequent email from that company gets through). The complexity of the system turns the spam nuisance into a product management nuisance. The micropayments system taught in this patent application is greatly simplified: there are only two ways to get in. Those ways are via micropayments and whitelists. Exsis emails that are sent within this system move in a proverbial parallel universe that exists inside the conventional email system. The Exsis emails are segregated from other emails into an Exsis inbox on the recipient's browser. From the user perspective, the user interface simply adds a new inbox in which is segregated Exsis email, so there are no significant product management issues or complex set up the user must deal with.

The genus of the invention is defined by several characteristics that all species within the genus will share.

1) There is a segregated inbox on all recipient computers who have downloaded and installed the Exsis software. The only way for any entity to get a protected email into this segregated inbox is to download and install the Exsis sender software and make a micropayment or be on the white list of the intended recipient. Having white list email in this segregated inbox makes it a highly attractive "premium channel" that the users will want to open and observe the contents since white list email is usually of the highest interest to recipients.

2) Email that is put into the segregated inbox will have a stemp. There are at least two kinds of stemps: 1) a branded logo chosen by the sender and usually comprising a miniature replica of the logo or trademark that identifies the senders brand in the market place such as "FED EX®." 2) white list stemps for senders the recipient has designated to be on her white list and who can send the recipient email for free. Senders who want their brand logo displayed as a source icon must pay for this service. White list senders will have their emails associated with a white list logo, and the identity of the sender will be displayed in the from column. Since the Exsis receiver software controls the display on the recipient's screen, the logo cannot be spoofed because it is encrypted with sender data that identifies the sender such as an account number and a transaction number.

3) Every stemp in an email in the protected email system will be encoded with information which directly or indirectly identifies the entity/person who sent the email. This happens when the account of the sender is accessed by the protected email server after the sender provides his user name and password in an initiation message. Phishers trying to pass themselves off as somebody else will not have access to the username and password of the person or company they are trying to appear to be, so their initiation message will have the wrong identifying information in it and expose them as phishers. In this way, phishers can be caught and prosecuted. This technique accomplishes much of the SMTi (a proposed rework of email that provides sender identity) without changing the infrastructure of the internet. The advantage is that it is purely voluntary. Nobody has to change anything if they do not wish to do so.

4) There must be a "middleman server" (called the protected email server or micropayments server in the claims) which issues stemps and authenticates senders. In the preferred species, the Exsis server does centralized management of accounts and implementation of the sending and authentication protocols with the sender and receiver software and manages white lists. This gives centralized control over accounts of senders and enables authentication of each Exsis email sent within the protected email system. This middleman process can be done by one or more servers which are together or physically dispersed, but the function they perform as a middleman must be there, so if they are physically dispersed, they must coordinate with each other to provide a uniform function from the standpoint of the recipient and sender software processes.

In a very important alternative species, the Exsis server also does centralized management of an opt out protocol and black lists for the various recipients to which protected emails are sent. This opt out protocol provides the ability for recipients to opt out of receiving any more emails from particular senders even if they are legitimate.

The segregated inbox with a micropayment/white list entry barrier keeps out the high volume spammers, but not the phishers who operate at much lower volumes and are usually willing to make a micropayment.

In some species within the genus, a generic logo will be offered. Senders who do not pay for a branded logo service showing their trademark or logo in miniature as the source icon have a source icon for their email which is a generic logo which does not specifically identify the sender but tells the recipient that the sender has been authenticated.

In some species, the branded logo is automatically authenticated, and will not be displayed if the logo does not come from the source it is supposed to be from. The logo is encrypted in such a way that phishers who pay a micropayment to get into the segregated inbox will be detected by the recipient because the logo will be absent when the authentication process fails. In some embodiments, when an authentication process fails, a warning message will be prominently displayed on the recipient's computer. In some embodiments, the authentication function mentioned in element 2 is automatic, while in others, it is a manual function that must be requested by the users so the branded logo will not be displayed until the user requests authentication thereof and it checks out as authetic.

The opt out ability of the system allows a user to control his Exsis inbox contents more effectively than in the prior art. It is very common for companies from, whom products were purchased to request email addresses on their product registration cards. They then use this information to send additional messages the user may not want or sell the email addresses to others who then send further unsolicited emails. Thus, the opt out function allows recipients to block receiving emails even from entities who are willing to pay the micropayments and regardless of whether the entity is legitimate or not. This opt out function works using the ID of the sender which must be given when a request for a stemp or Truemark is made. Thus, even if a sender gets an email address from a mailing list or uses one or more third party sending services, if the sender uses his user name and password to obtain a stemp, he will be blocked if his ID has been placed on an opt out black list.

BRIEF DESCRIPTION OF THE DRAWINGS

FIG. 4 is a diagram of a user interface display which uses a single pane content window to display Exsis emails that either contain stemps or are from white list recipients.

FIG. 10 is an example table depicting mappings between transaction numbers and email sender identities.

DETAILED DESCRIPTION OF THE PREFERRED AND ALTERNATIVE EMBODIMENTS

Figure 1:
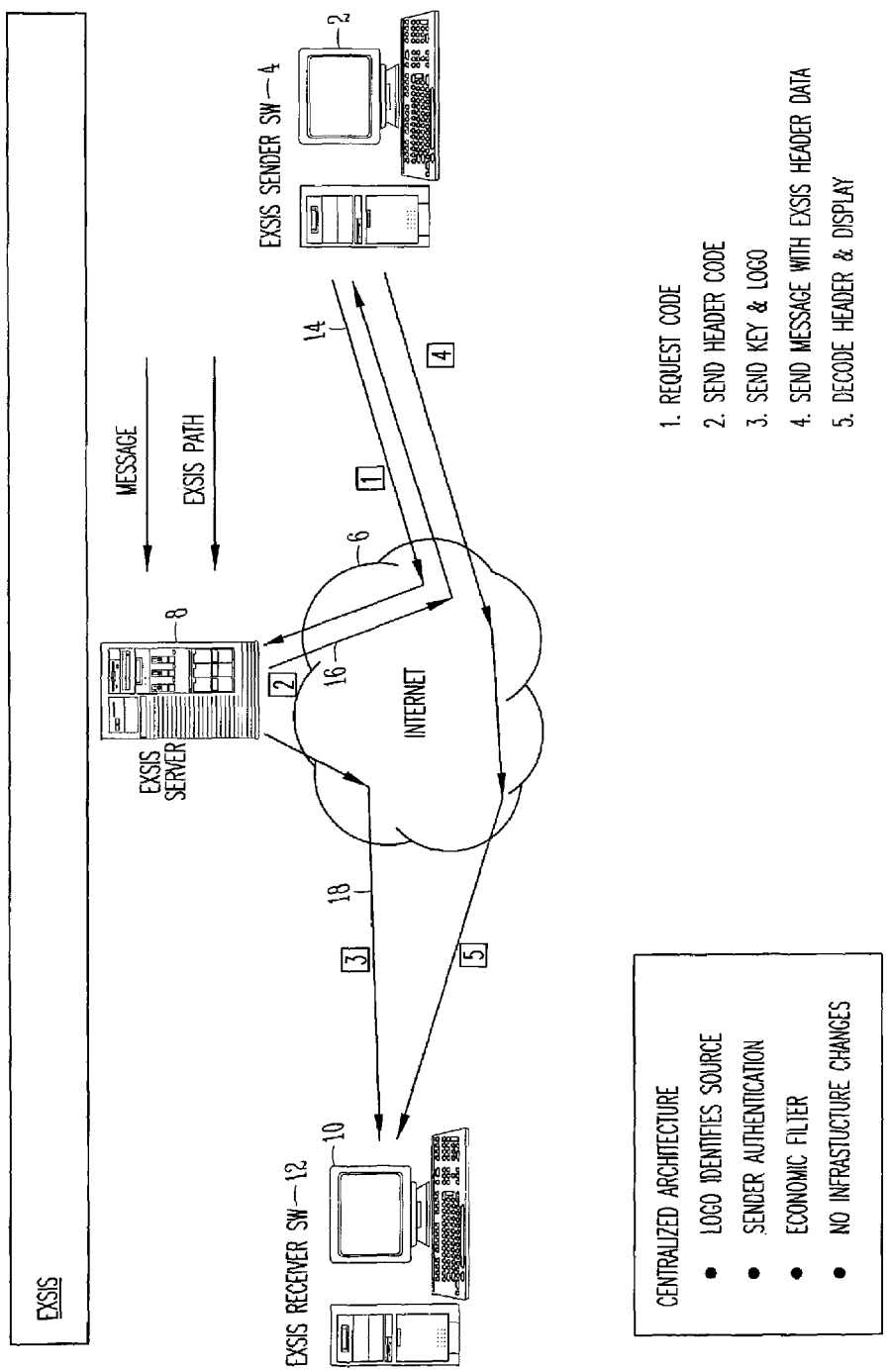
FIG. 1 is a diagram of the Exsis micropayments system hardware.

Referring to FIG. 1, there is shown a diagram of the Exsis micropayments system. The computer 2 of a sender executes Exsis sender client software 4 which controls computer 2 to communicate in accordance with a protocol to be described below over the internet 6 with an Exsis server 8. Typically, the sender client software 4 is software which is downloaded from the Exsis server 8 when the user establishes an Exsis account. The Exsis server implements a micropayments process and communicates both with the sender computer 2 and a recipient computer executing Exsis receiver client software 12. In the claims, the Exsis server is referred to as a "protected email server" and the sender software 4 and receiver software 12 are referred to as "protected email software".

Typically, the Exsis receiver software 12 is software which is downloaded from the Exsis server 8 when the user establishes an Exsis account. The users of sender computer 2 and recipient computer 10 simply download and install the software and they are done and a parallel universe for segregating Exsis paid and whitelist email within their computers is established. Typically, sender software 4 and receiver software 12 are the same piece of software which has capabilities described herein to both send and receive Exsis email. Advanced users can manage the Exsis sender and receiver software using the rules of their email if they so choose. The sender and receiver computers and the Exsis server are typical computers with keyboards, pointing devices, displays, central processing units and monitors.

Figure 2A:
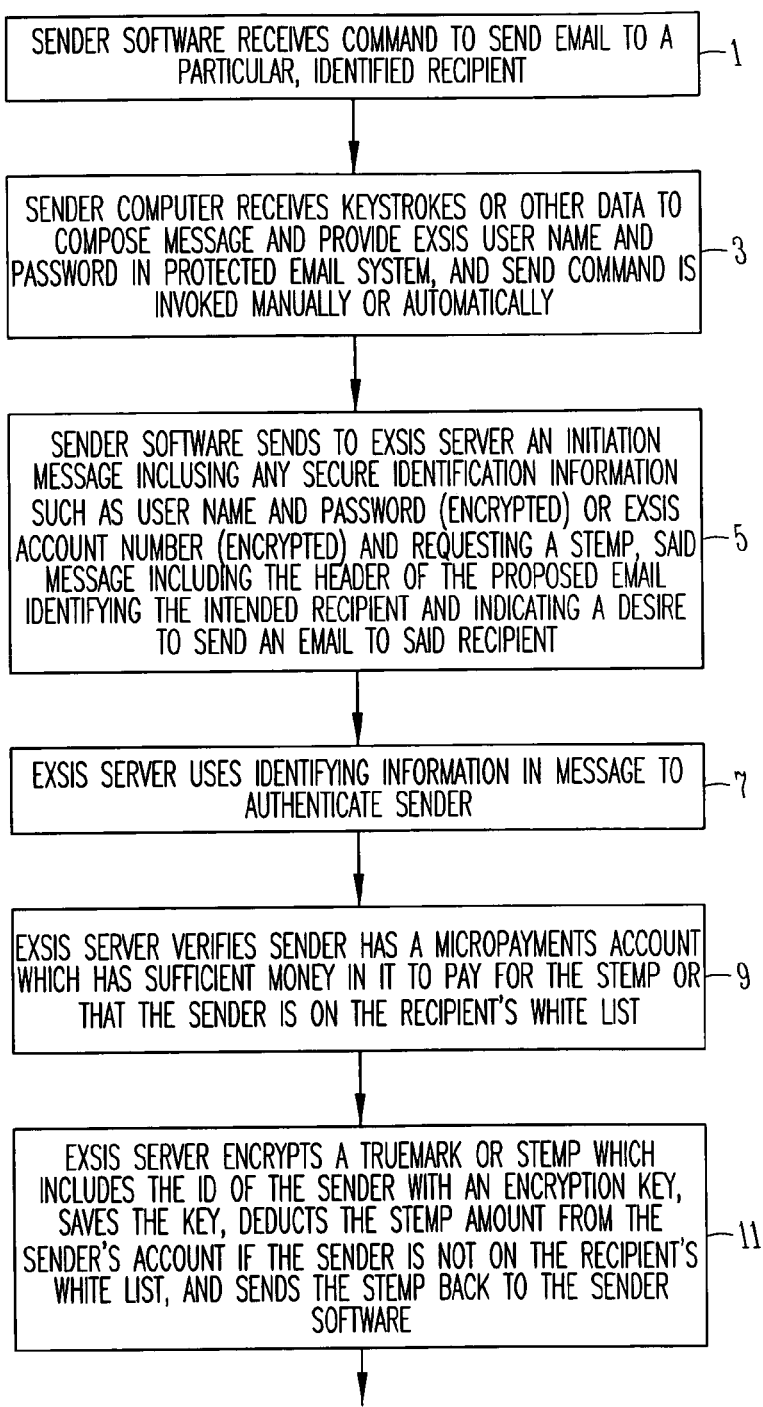
FIG. 2 is a flowchart of an alternative embodiment of a basic Exsis micropayments protocol.
Figure 2B:
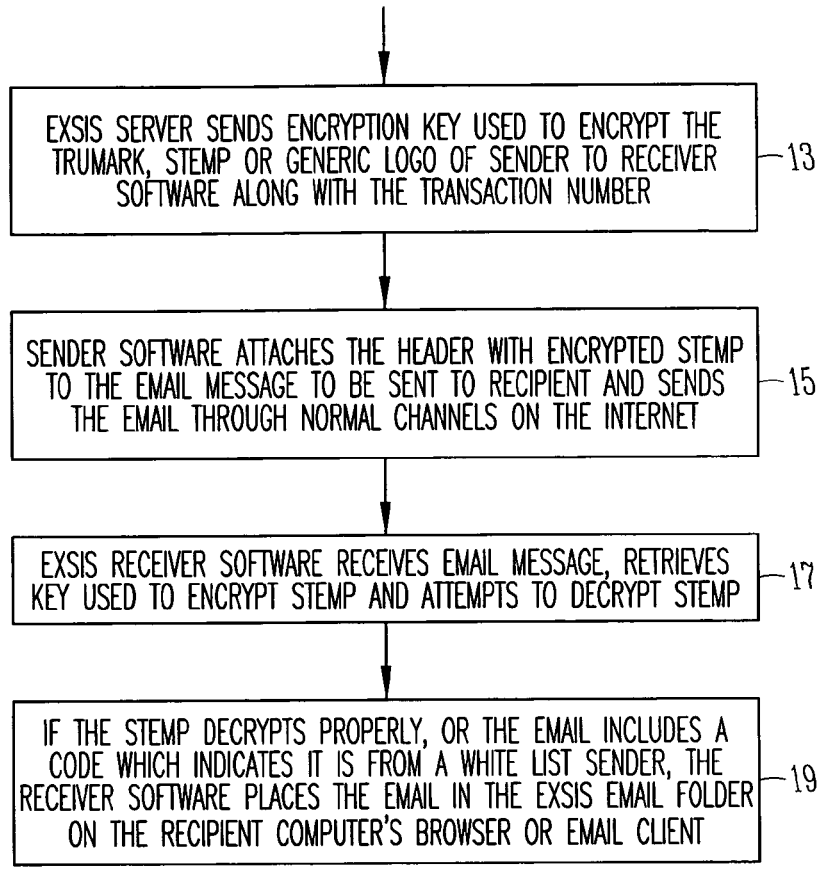

FIG. 2, comprised of FIGS. 2A and 2B, is a flowchart of an alternative embodiment of a basic Exsis micropayments protocol. When the sender wishes to send a paid email or a white list email (free but allowed in by the receiver software 12 because the sender is on the recipient's white list of friends, associates, family members and other entities the recipient consents to receive from), a command is given to the Exsis sender software indicating the desire to send an email to a particular, identified recipient (step 1). A message is then composed for sending and when the message is ready to send, the send command is given (step 3). The input data includes an Exsis user name and password identifying the sender in the protected Exsis email environment. The password (and user name in some embodiments) will be encrypted and sent to the Exsis server in an initiation message with a request for an encrypted stemp. In some embodiments, the user may enter her Exsis account number which will be encrypted and sent with the request for the stemp in the initiation message. In the claims, the user name and password or account number are referred to as sender identification information.

In response to the send command, the sender software 4 sends an initation message to the Exsis server identifying the recipient with the sender identification information (sender identification is provided by user name and encrypted password or by account number or by user name, password and some secure information that only an authentic sender would know) and requesting the Exsis server to send back a code (a stemp) which will cause the message to be not blocked by the recipient software 12 (step 5). In this alternative embodiment, this message includes a user name and password (encrypted) and this information is used to look up the sender's Exsis account number. In other embodiments, this message includes the encrypted Exsis account number of the sender. It also includes the header of the email, and this header includes the sender's IP address and the recipient's email address. The Exsis server preferably uses the user name and decrypted password or the decrypted Exsis account number to determine the identity of the sender, and this process acts as an automatic authentication of the user. The requested code can, in some embodiments, be an encrypted "Truemark logo. " logo in the case of a paid email which is identified with the sender's brand. The requested code can also be an encrypted generic logo which serves as a paid email code indicating that the sender paid to transmit the email with his validated identity encoded therein and wants to be segregated into the Exsis inbox to be away from all the unpaid spam but has not paid to have the company logo displayed. Or the requested code can be an encrypted white list logo indicating the sender is on the recipient's white list. In other words, there are three classes of protected email as distinguished by their stemps: 1) Truemark stemps which are associated with paid senders who conspicuously identify themselves with their own trademarks; 2) generic stemps associated with paid senders who do not conspicuously identify themselves; and 3) white list stemps associated with senders that the recipient has white listed. All three types of stemps are issued, in the preferred automatic authentication embodiment, by using the sender's account information as identified from his user name and password and the validation process.

The Truemark stemps are logos or trademarks. The paid email generic logo type stemp is yellow in the preferred embodiment. The unpaid email from your white list (white list stemp) is green in the preferred embodiment. In alternative embodiments, different shapes can be used instead of different colors. The key thing is any person can distinguish the types (and the sender in the case of Truemarks) with no training. Of course, with whitelist senders, the purported sender shows up in the from column, so odds are the recipient knows who sent the email, and can trust that "from" designation because there is also the validation of the whitelist stemp.

For the authentication results (sender ID data screen) the Exsis server can display anything on the recipient computer display to identify the authenticated sender for various embodiments. The preferred embodiment shows the trademark registration for the logo, but generic stemps and whitelist stemps would be substantially less informative—just showing whatever ID was used to set up the Exsis protected email account. White list senders get their integrity from the fact that the recipient designated who is on the white list. Generic stemps have a penny's worth of integrity (only a small micropayment was paid to have the generic stemp issued)—that's why they are yellow and that is why, in some embodiments, they are not permitted. Or they have lots of integrity since it costs $4M to send 400 million emails.

Returning to the consideration of FIG. 2, the Exsis server, in the basic embodiment, receives the initiation message in step 5 and does the following things. 1) It uses information in the header of the email to be sent such as the IP address of the sender and/or the sender's Exsis account number and/or the user name and decrypted password and/or other secure information only the sender would know to authenticate the sender as actually being the sender the email purports to be from (step 7). This involves decrypting the account number in the incoming message, and looking up the identity of the entity with that account number. 2) It makes sure the sender has a micropayments account with sufficient money in it to cover the cost of the stemp and the sender is not on a black list or opt out list of the recipient or the sender is on the recipient's white list (step 9). 3) If conditions in step 2 are determined to be proper (account with sufficient money in it exists for this authenticated user, no black list entry in recipient's black list for this sender or sender is on recipient's white list) assigns a transaction number, encrypts a Truemark or stemp that contains the ID of the sender and the transaction number, saves the encryption key, deducts the amount of the stemp from the sender's account if the sender is not on the recipient's white list, and sends the encrypted stemp back to the sender software 4 (step 11 and message 16 in FIG. 1). The stemp is generated by generating a transaction number when the sender has been authenticated. In some embodiments, this transaction number is encrypted and the account number of the sender is encrypted. In these embodiments, these two pieces of encrypted data are then concatenated or otherwise merged and a hash of the result is performed. The resulting hash is the stemp or code which links the sender to his Truemark logo. This code is then sent back to the sender process by incorporating it into the proposed email message header and sending the header back to the sender. 4) The server then sends the encryption key, the encrypted transaction number and the corresponding "Truemark logo." for the sender to the receiver software 12 (step 13 and message 18 in FIG. 1). A Truemark is the term coined by the assignee of the present invention for the logo of a company or other entity which has been authenticated and which is displayed in the Exsis email inbox or folder. Hereafter the phrase "Truemark logo." will be shortened to just "Truemark" but no generic use of the mark Truemark as the name of the authenticated logo is intended and the term "Truemark" is intended to be read Truemark logo.

In step 15, the sender software 4 receives the header with the encrypted stemp in it back from the Exsis server. This header is put on the email message to be sent to recipient, and the email message is then sent to the recipient through normal channels on the internet or some other WAN.

In steps 17 and 19, the Exsis receiver software receives the email with encrypted Truemark, generic stemp or white list stemp, and retrieves the encryption key used to encrypt the Truemark, generic stemp or white list stemp. The Truemark, generic stemp or white list stemp is dehashed using the reverse hash algorithm. The key is then used to attempt to decrypt the account number and the transaction number encoded in the Truemark, generic stemp or white list stemp, and if the Truemark, generic stemp or white list stemp decrypts properly, the transaction number will match the transaction number received from the Exsis server and the account number will match a table entry matching Exsis account numbers to Truemarks (which table is stored in the recipient computer in some embodiments). If these items match what the recipient computer has, the email is stored in an Exsis email folder with its Truemark. The emails in this folder will be displayed whenever selection of the Exsis icon in the navigation pane of the recipient's browser or email client occurs.

In some embodiments, the Truemarks, stemps or generic logos that are displayed with the emails in the Exsis email folder contents are the Truemarks, stemps or generic logos received from the Exsis server. In other embodiments, the recipient computer maintains a table that associates each Exsis account number with a corresponding Truemark or generic logos, and that table is consulted to find and display the appropriate Truemark or generic logo when a Truemark, generic stemp or white list stemp in a received email is received and properly decrypted and the account number is retrieved therefrom.

In order to spoof this system, a phisher would have to do the following things: Spoof the Exsis server into generating a transaction number by sending a message with the proper account number of the sender the phisher wants to pretend to be and properly encrypt that account number. In other words, the phisher would have to know the account number of the business he wanted to pass himself off as and know the proper encryption algorithm and key that that business would use to encrypt its Exsis account number. Then the phisher would have to obtain the transaction number that had been sent to a recipient in response to the phisher's request or decrypt the transaction number sent from the Exsis server to the recipient. The phisher would then have to receive the encrypted stemp it spoofed the Exsis server into generating or know the encryption and hashing algorithms used to generate the stemp and generate the same stemp the Exsis server would generate had a request from the authentic sender been sent to the Exsis server.

Figure 3:
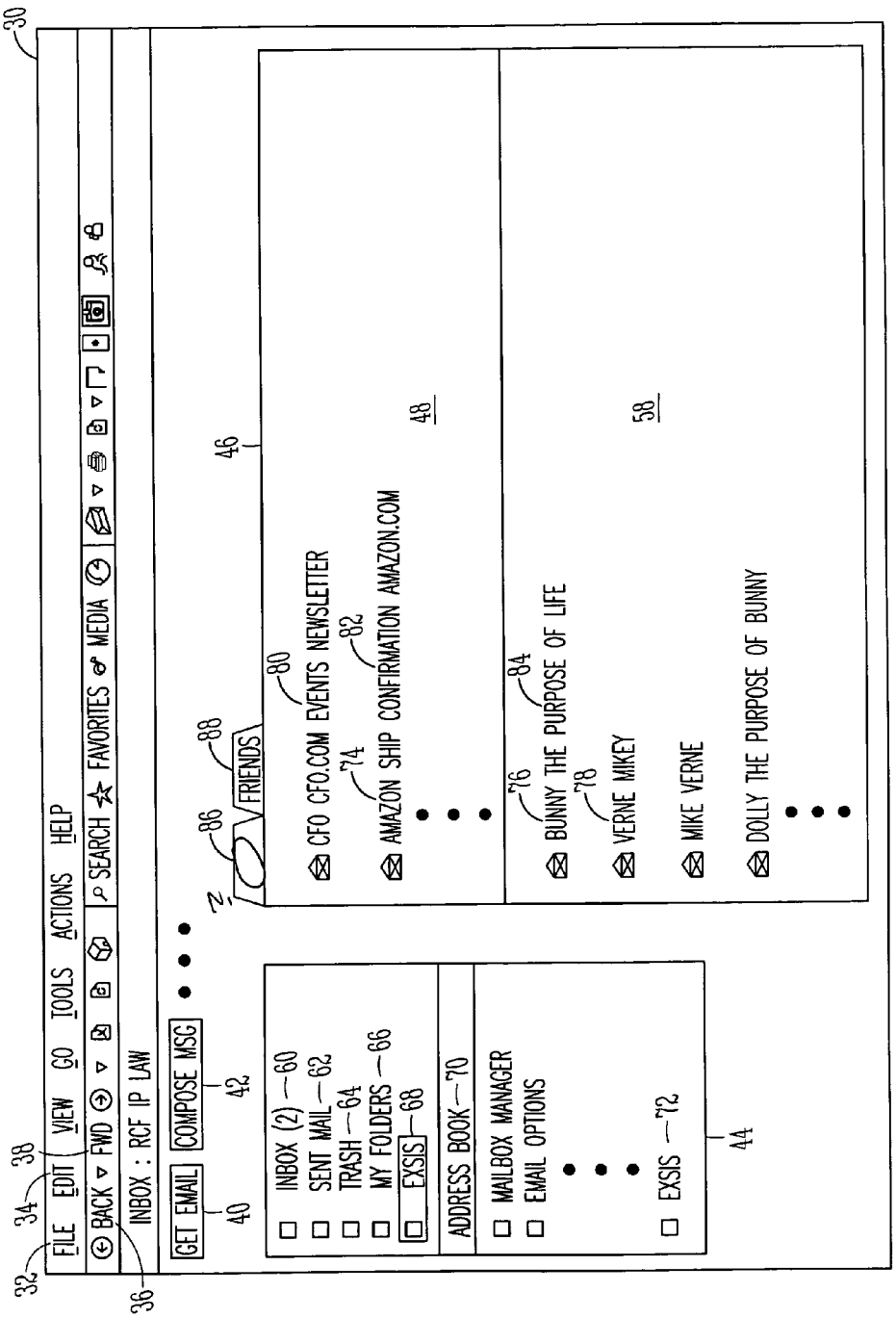
FIG. 3 is a drawing of a typical screen shot for the user interface of an embodiment of the invention which uses split screens segregation of emails, Truemarks on emails with stemps and a separate folder for micropayment email.

Referring to FIG. 3, there is shown a drawing representing several species within a genus of browser user interfaces to segregate Exsis paid email and white list email from other email that does not fall into either of those categories because it was not sent as a result of an exchange of messages with the Exsis server. There are several species within this genus each of which will be described below. FIG. 3 represents a first species where both paid and white list emails are simultaneously displayed. This species is represented by the panes 48 and 58 which are simultaneously displayed when the Exsis icon 68 in navigation pane 44 is selected. Another species is represented by the Logo Mail and Friends tabs 86 and 88. In this species, when the Exsis icon 68 is selected and the Logo Mail tab 86 is selected, paid emails from the current day show up in pane 48, and paid emails from the previous day show up in pane 58. When the friends tab 88 is selected, emails from friends and family on the white list from the current day show up in pane 48, and white list emails from the previous day show up in pane 58.

We now proceed to a more detailed discussion of the various elements of the display shown in FIG. 3. The display shown in FIG. 3 represents the browser mail user interface for a computer which has been programmed with software which is part of the invention to use segregation of paid and friends emails from other email using an Exsis folder in the navigation pane, company Truemarks on emails with stemps and tabs to segregate micropayment email from white list email. The browser window outline is shown at 30. The normal drop down menu commands such as "file", "edit" etc. are shown at 32 and 34 as examples. The conventional "back" and "forward" commands to navigate the browser back to the previous web page and forward to the next web page in a sequence of web pages already visited are shown at 36 and 38, respectively. Icons for normal email commands such as "get email" etc. are shown at 40 and 42.

Box 44 represents the navigation pane. The items on the navigation pane can be selected to control which is displayed in the content pane 46. The conventional items in the navigation pane are the inbox icon 60, the sent mail icon 62, the trash icon 64, and the my folders icon 66. When the inbox icon 60 is selected, all contents of the inbox (emails not sent as a result of an exchange with an Exsis micropayments server) are displayed in the content pane. When the sent mail icon 62 is selected, the subject lines and other information about all the emails the user has sent are displayed in the content pane 46. When the trash icon is selected, all the emails the user has deleted are displayed in the content pane 46.

All species within the genus of the invention include an Exsis icon shown at 68 and located somewhere in the navigation pane 44 (an alternative location is shown at 72). This icon, when selected causes all Exsis emails to be displayed in the content pane 46. Exsis emails are paid and white list email sent as a result of an exchange between a client process on the sender's computer and the Exsis micropayments server. The Exsis micropayment server functionality and the functionality of the client processes in the sender and recipient computers is described in U.S. patent application METHOD AND APPARATUS FOR IMPLEMENTING A MICROPAYMENT SYSTEM TO CONTROL E-MAIL SPAM, filed Jul. 14, 2004, Ser. No. unknown (hereafter the micropayments patent application).

In some embodiments, the Exsis icon 68 is displayed in the top half of the navigation pane above the address book icon 70. In alternative embodiments, the Exsis icon is shown in the lower half of the navigation pane such as at 72. In all embodiments within the genus of the invention, the Exsis icon will show up somewhere in the navigation pane and selection of it will cause the segregated Exsis email to be displayed in the content pane 46.

When the Exsis icon is selected, as it is in FIG. 3, as indicated by the box around the icon indicating highlighting in the user interface, the contents of the content pane will be a listing of all the Exsis emails, i.e., emails that have been sent after an exchange between the Exsis micropayments server and the client browser that sent the email. Some of the emails sent as a result of this exchange with the Exsis micropayment server will have encrypted stemps representing micropayments embedded in the email header. These emails are usually from businesses who want to send a message to one of their customers and make sure it gets seen by the customer and not thrown out or blocked by the anti spam functions of the recipient browser. These emails will be displayed with Truemarks (the logo of the sender). In some embodiments, the Truemarks are only displayed after the sender of a paid Exsis email has been authenticated. In other embodiments, the paid Exsis emails will be displayed with their Truemarks provisionally when received, and, if after a user has requested authentication of the email, the email turns out to not be authentic, the email and its Truemark will be removed from the Exsis inbox.

In the micropayments patent application incorporated by reference herein, functionality for the recipient browser is described which blocks incoming emails which do not have stemps unless they are on a "white list" of friends and family who can send email to the recipient for free.

In the particular simultaneous paid and white list embodiment shown the content pane has been split into two separate panes, the top pane 48 being for paid emails which include stemps, and the bottom pane 58 being for unpaid emails from friends or other people or organizations on the recipient's white list. In some other embodiments, the contents of pane 48 is displayed if the Logo Mail tab shown at 86 is selected, and the contents of pane 58 are shown if the friends tab at 88 is selected. In still other embodiments, both panes 48 and 58 are shown simultaneously in a split pane format as shown in FIG. 3 and organized by date of the email with paid emails being shown if the Logo Mail tab is selected and white list email being shown if the friends tab is selected. In other embodiments, only a single window to the right of the navigation window 44 is shown, and its contents display email with stemps if the Logo Mail tab 86 is selected and its contents display the white list emails if the friends tab 88 is selected.

This segregation of paid emails in panes 48 from unpaid "white list" emails in pane 58 is believed to be new. Emails that appear in the panes 48 and 58 are emails that have been processed by an exchange with the Exsis server. All other emails that are sent from a sender to a recipient by normal channels without an exchange with the Exsis micropayments server are the emails that show up in the recipient's inbox when the inbox icon 60 in the navigation pane 44 is selected.

In the case of the unpaid "white list" emails in pane 58, the sender's email client includes one or more processes that communicate with the Exsis micropayments server telling it that the sender would like to send an email to recipient whose inbox display of the recipient browser or email client is shown in FIG. 3. The sender's email client does not send the entire text of the email to the Exsis server but does send the header. The Exsis server checks the white list it maintains for the recipient and finds that the sender is on the white list. The Exsis server then sends back the header of the email with coded data added to it which indicates that the sender is on the white list of the recipient and need not include a micropayment stemp in the email header. The sender's email client then attaches the header received from the Exsis server to the email and sends it to the recipient via normal channels on the internet. This process of communicating with the Exsis server to tell it the sender wants to send email to a particular recipient and sending the header of the email and receiving back a modified header from the Exsis server coded as "white list", attaching the modified header to the email and sending the resulting email to the recipient through normal channels is implemented by Exsis sender software executing on the sender's computer and cooperating with the operating system and email client and/or browser thereof. There is no need for the email to pass through the Exsis server, although this may be done in some species.

When the email arrives at the recipient computer, the email client or browser invokes an add-on process implemented by Exsis recipient software. In some embodiments, this add on process in the recipient computer is a plug in which is active at all times. This add-on process checks the header of the incoming email for coding indicating it has a stemp or is a white list email. If it has a stemp, an authentication process to be described later herein is made, and, if the email is authentic, an entry is made in pane 48. If the email is coded as a white list email, its source is automatically authenticated in one embodiment, and, if the email is actually from the white list person or company it purports to be from, an entry is made in pane 58. If the email is authentic and has a stemp, an indication as to who the email is from is given in the email listing in pane 48. If the email is authentic and is from a white list recipient, an indication of who the email is from is displayed such as is shown by the names at 76, 78 etc.

In the preferred embodiment, the indication of who an authentic email bearing a stemp is from is given in the form of an icon which is a miniature duplication of the Truemark of the company or person that sent the email. The Truemark can be stored in the recipient computer in some embodiments or, in other embodiments, is downloaded from a server such as the authentication server or the Exsis server (called the protected email server or the secure micropayment server in the claims). An example of such a Truemark icon indicating the authentic source of the email is shown at 74 in pane 48. This particular email is from Amazon.com, and the fact that the Truemark icon at 74 is displayed at all is a representation to the recipient that the email has been authenticated in the manner described below and is actually from Amazon.com (in some embodiments, the Truemark is displayed on all incoming protected emails even if they have not already been automatically authenticated, and the user knows that the Truemark can be authenticated using the manual procedures described herein). If an email is from a white list recipient who does not have a Truemark, the icon displayed after authentication can be a generic icon provided by Exsis for some small payment such as the cost of a stemp. In other embodiments, white list icons can be anything the recipient configures in his address book such as a miniature digital photo of the person, their name or a nickname.

The Truemark logos are protected from phishers because of the process of obtaining them. When a legitimate company with an Exsis account makes a request for a stemp with the proper user name and password, he is authorizing the Exsis server 8 to access his financial account. Assuming the user name and password are correct, an account exists and it has sufficient money in it, the stemp will be issued and the logo of the sender will be sent to the recipient. The logo will be either automatically authenticated before sending or it will be automatically authenticated when received by the recipient software or the user may request the logo be authenticated by making a manual request. As long as the owner of the Truemark logo maintains adequate control of his user name and password, no phisher will be able to palm off a fake logo in the segregated inbox. Recipients know this, so they can view emails messages in the Exsis inbox at any time because they know the message has either already been authenticated or the recipient can authenticate it with a couple simple keystrokes using the dialog box 100 in FIG. 5.

Every Truemark, even the generic logo will be encoded with the ID of the guy who affixed it to his email. This happens when the account of the sender is accessed after the sender provides his user name and password. The Exsis server knows the entity that has the user name and password entered with the request to issue a stemp and send the user's logo. In order to get an Exsis account associated with a branded stemp, i.e., a logo called a Truemark, a person establishing the account will have to go through a due diligence investigation. This is conducted by Exsis employees and requires evidence that the sender attempting to establish the account and Truemark is currently employed by the company they say they are employed by, and have the authority to establish the account on behalf of that company. What distinguishes a Truemark or branded stemp from trusted certificates is the following: 1) the Truemark does not require a genius to understand it; 2) the Truemark is extremely consumer friendly; 3) the Truemark works in outlook and webmail whereas the trusted certificates do not; 4) the quality of trusted certificates is variable with some certificates being not so trustworthy.

A similar due diligence process may be performed for white list senders who wish to establish an account and use a generic logo. However, the due diligence process may be eliminated or highly attenuated in some embodiments since the phishing problem is peculiar to large companies who lend credibility to the phisher's call to action. They simply do not pass themselves off as individuals. Technically, a phisher may be able to establish a false account in somebody else's name and set up a user name and password, if they know enough about that person to perform an identity theft. But it is unlikely that such a spoof would pass the due diligence if the account set up was attempted by a phisher in the name of a big corporation. Encoding the sender's ID in the Truemark or stemp will help block phishers because even if the phisher is able to spoof the system and establish a fraudulent account, when the recipient's complain, the Truemark or generic logo will be sent back to Exsis and decoded to reveal the identity of the person who established the fraudulent account. This will lead to arrests and prosecutions and cause phishers to avoid the Exsis environment.

The target customers for Truemarks are entities who brand identity is being damaged by phishers.

The functionality of the native browser or email client is used in some embodiment by the add-on process to display the subject line of each email, e.g. 80, 82 and 84, and to display conventional icons or other user interface tools such as bold or highlighting of unread messages to indicate whether a message has already been read or not. In other embodiments, the add-on process does all the work of displaying the emails including all the work normally done by the conventional browser or email client.

If an email comes in which does not have a stemp nor a coding to indicate it is from a white list recipient, it is placed in the inbox which is displayed when the inbox icon 60 is selected.

In summary, in the embodiment described above, every time an email is received, the add-on process executing in the recipient computer automatically authenticates the source of the email by a process to be described below, and will not display it in pane 48 or 58 unless it is authentic. Authentic emails are displayed with Truemark icons in pane 48 and with whatever the recipient configures in his white list address book for white list recipients.

FIG. 4 is a diagram of a user interface display which uses a single pane content window to display Exsis emails that either contain stemps or are from white list recipients. In the display of FIG. 4, the Exsis icon 90 is displayed in the navigation pane 92 and is selected. This causes the content window 94 to display a single pane of emails which both contain stemps and which are from senders on the recipient's white list. For example, the email from CFO.com whose Truemark is displayed at 96 (because it has been authenticated as actually being from CFO.com) is displayed along with an unpaid email from a person Bobby on the white list of the recipient, with an icon displayed at 98 indicating this email has been authenticated. The user interface of FIG. 4 works the same way as the user interface of FIG. 3 except that only a single pane of Exsis emails is displayed with stemp email mixed in with non stemp email. No Logo Mail or Friends tab is necessary therefore, and these tabs 86 and 88 from FIG. 3 are omitted in the display of FIG. 4. In the particular species of FIG. 4, the content window 94 is divided into sections for emails dated today and emails dated yesterday, but in other embodiments, only a single pane with both stemp and non stemp emails mixed together is used with the ability to sort on any field.

A common element between all embodiments of user interfaces according to the genus of the invention, two examples of which are represented by FIGS. 3 and 4, is that the white list emails are displayed or can be displayed in the Exsis folder along with the paid emails. This attracts users to click on the "Exsis." folder which they would be less inclined to do if they knew that the "Exsis." folder only contained paid emails. This gives advertisers a way to use the internet to send cheap advertising that is known to the users to be authentic and which is segregated out from all the spam in the user's inbox by virtue of being segregated from the other email in the inbox 60 by being placed in the Exsis folder. The fact that white list emails will also be in this folder gives such advertisers a much improved chance that the users will click on the Excis folder navigation icon 68 or 90 and have their emails viewed. The automatic authentication process or authentication on demand protects such users from fear they are being "phished" and further improves the chances of a response to a legitimate paid email. This user interface genus provides advertisers with an entirely new, less expensive, secure way to get advertising messages to a targeted list of customers or potential customers.

The particulars of the conventional browser interface and email commands can vary from one type of browser and email client to the next, and are not critical to the invention. For the user interface claims, the details of how the recipient computer add-on process processes incoming emails, interacts with the operating system or interacts with the conventional browser or email client are not critical to the invention. It is only how the computer displays the Exsis icon in the navigation pane and how the paid and white list emails are segregated and displayed alone by selection or together simultaneously that constitute the user interface invention.

Figure 5:
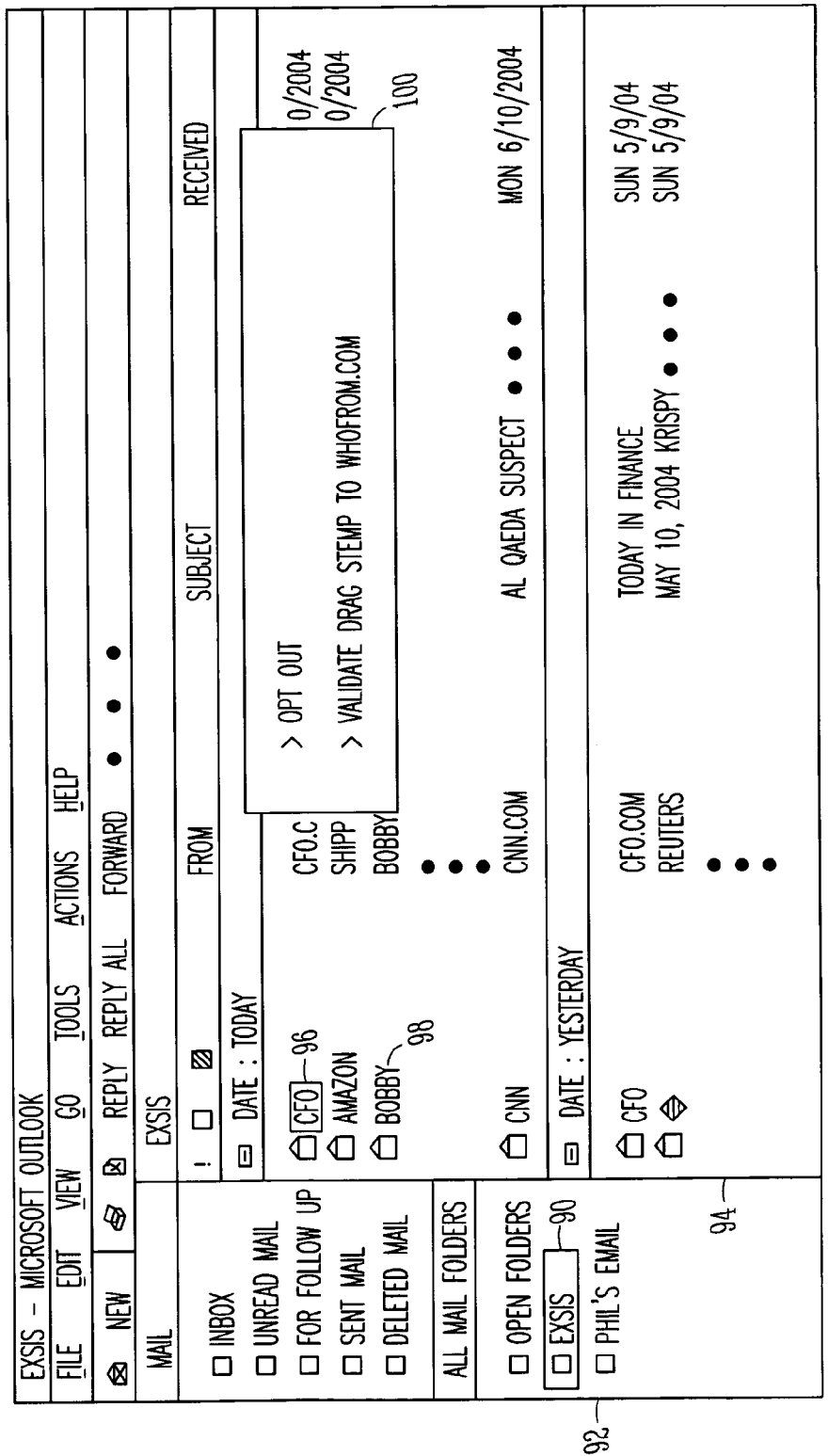
FIG. 5 is a screen shot representing another class of embodiments which requires users to ask for particular emails to be authenticated by selecting the email and selecting an authentication command and gives a user an option to opt out.

All the embodiments discussed so far include automatic authentication of emails to verify they are from who they purport to be from. FIG. 5 is a screen shot representing another class of embodiments which requires users to ask for particular emails to be authenticated by selecting the email and selecting an authentication command and gives a user an option to opt out. The opt out option means the user can request the Exsis server to block further emails from the sender of a particular email even if the sender attempts to attach a paid up stemp to the email. The options are provided in a pop up dialog box 100. This pop up dialog box can be caused to appear in many different ways such as by typing a hot key combination when a particular email is selected or the cursor is resting on the email or the Truemark of the email, or by clicking on the Truemark or logo of the email or by a drop down menu selection added to the conventional drop down menus. Any user interface mechanism that provides the ability of a user to select a particular email in the Exsis inbox and provides commands to authenticate or opt out will suffice to practice the invention. In the preferred embodiment, the pop up dialog box 100 is caused to appear when the user double clicks on the Truemark of an email he wants to have options regarding. For example, suppose a user wants to opt out of receiving any further emails from CFO.com or wants to validate an email purporting to be from amazon.com. To opt out of emails from CFO.com, the user would double click on the CFO Truemark 96 in FIG. 5, and that would cause dialog box 100 to appear. The user would then double click on the "opt out" command in the dialog box 100. This would cause the process shown in the flowchart of FIGS. 6A and 6B to occur.

*In alternative embodiments to all the embodiments described herein, the Exsis receiver software 12 in FIG. 1 includes the ability to send email messages to friends, family and others the recipient wants on his white list informing them they have been placed on his white list. Simultaneously, a message is sent to the Exsis server 8 which requests the server 8 to put the friend, etc. on the recipient's white list and giving the server 8 the email address of the person or other entity to be added to the white list. The server responds by putting the email address of the sending on the white list of the recipient who sent the message requesting a particular person or entity to be added to the white list. This gives users of the Exsis system the ability to cause certain persons emails to be sent for free and to be segregated into the user's Exsis inbox.

Figure 6A:
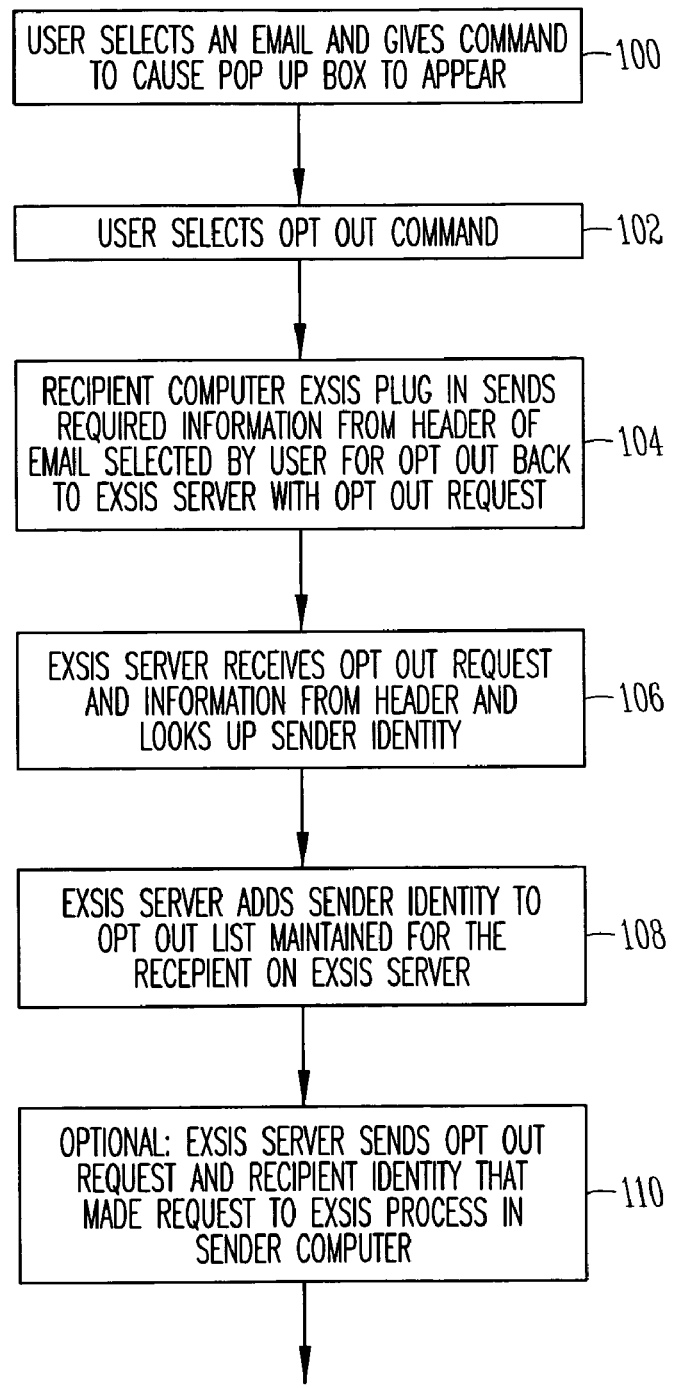
FIGS. 6A and 6B are a flowchart of the process carried out by the recipient computer and Exsis server to implement the opt out option.
Figure 6B:
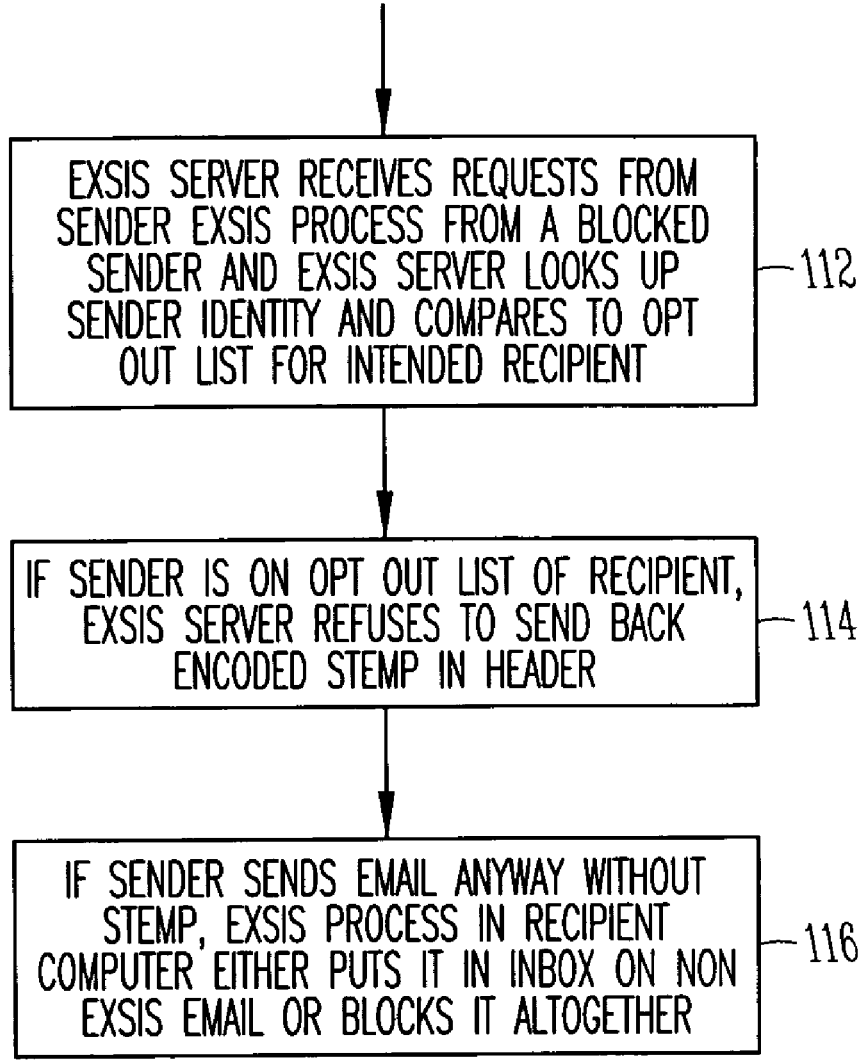

FIGS. 6A and 6B are a flowchart of the processes which occur at the recipient computer, the Exsis server and the sender computer when a user has selected an opt out command from the pop up dialog box on the recipient's computer. Step 100 represents the process of the user selecting a particular email and giving a command to cause the pop up box 100 to appear. In the preferred embodiment, both things (selecting the email and causing the pop up box 100 to appear) are accomplished simultaneously by double clicking on the Truemark of the email to be subjected to the opt out process. In alternative embodiments, this may be done by clicking once on the email to be selected, typing a hot key combination to cause the dialog box 100 to appear and then double clicking on the opt out function. The dialog box 100 can also be made to appear in any other way such as by dragging the cursor over or double clicking on an icon on the screen somewhere or selecting it as a command bar icon or a drop down menu item from some other command bar icon such as the edit icon 34 in FIG. 3.

Step 102 represents the process of selecting the opt out icon. In the preferred embodiment, double clicking the Truemark causes the pop up box to appear, but then the user must double click on the opt out command to start the opt out process.

Step 104 represents the process carried out by the Exsis plug in software in the recipient computer of sending the required information from the header of the email selected by the user for opt out back to the Exsis server with a message that indicates this user wishes to opt out from receiving any more paid or unpaid emails from the sender identified in the header information transmitted back to the Exsis server. Typically, this information from the header will be the encrypted Exsis micropayment account number and the transaction number or the IP address of the sender, etc. IP addresses are not reliable though since IP addresses are dynamically assigned to most users by DHCP servers at the ISP or router at the edge of the LAN on which the sender computer resides.

In step 106, the Exsis server receives the opt out request message and uses the information from the header of the email selected for opt out to look up the sender of the email. Typically, this is done by using the transaction number to look up the encryption key used to encrypt the Exsis micropayment account number and using that key to decrypt the account number. Then the account number is used to look up the identity of the sender. If the account number does not decrypt properly, the email is not from whom it purports to be from, and a message is sent to the recipient computer indicating the email is not from whom it purports to be from.

In step 108, the Exsis server adds the sender's identity to an opt out list maintained on the Exsis server for the recipient.

Step 110 is optional. If this step is performed, the Exsis server sends the opt out request message and recipient identity to the Exsis sender software of the sender computer of the sender identified in the opt out request. This allows the sender to remove this recipient from its lists of target recipients thereby saving the micropayments for emails to that recipient.

After adding the sender to the recipient's opt out list, the Exsis server receives in step 112 requests from a sender Exsis process running on a computer of a blocked sender. The Exsis server then looks up the sender identity from the message received from the sender and compares that identity (after authentication) to the opt out list of the recipient to whom the sender indicated it wants to send a message.

If the sender is on the opt out list of the recipient, the Exsis server refuses to send back an encrypted stemp or white list code to the sender thereby effectively blocking that sender from getting any email messages into the Exsis folder of the recipient, as represented by step 114. If the sender sends email anyway, the Exsis receiver process software shunts such non Exsis email into the normal inbox of the recipient email client or browser or blocks it altogether.

This opt out function works because of the centralized nature of the economic process to obtain stemps. By simply blocking the process of sending back a stemp (or a white list code) when a sender is on an opt out list, a sender can be effectively blocked from getting any email into the Exsis inbox of the recipient.

Figure 7:
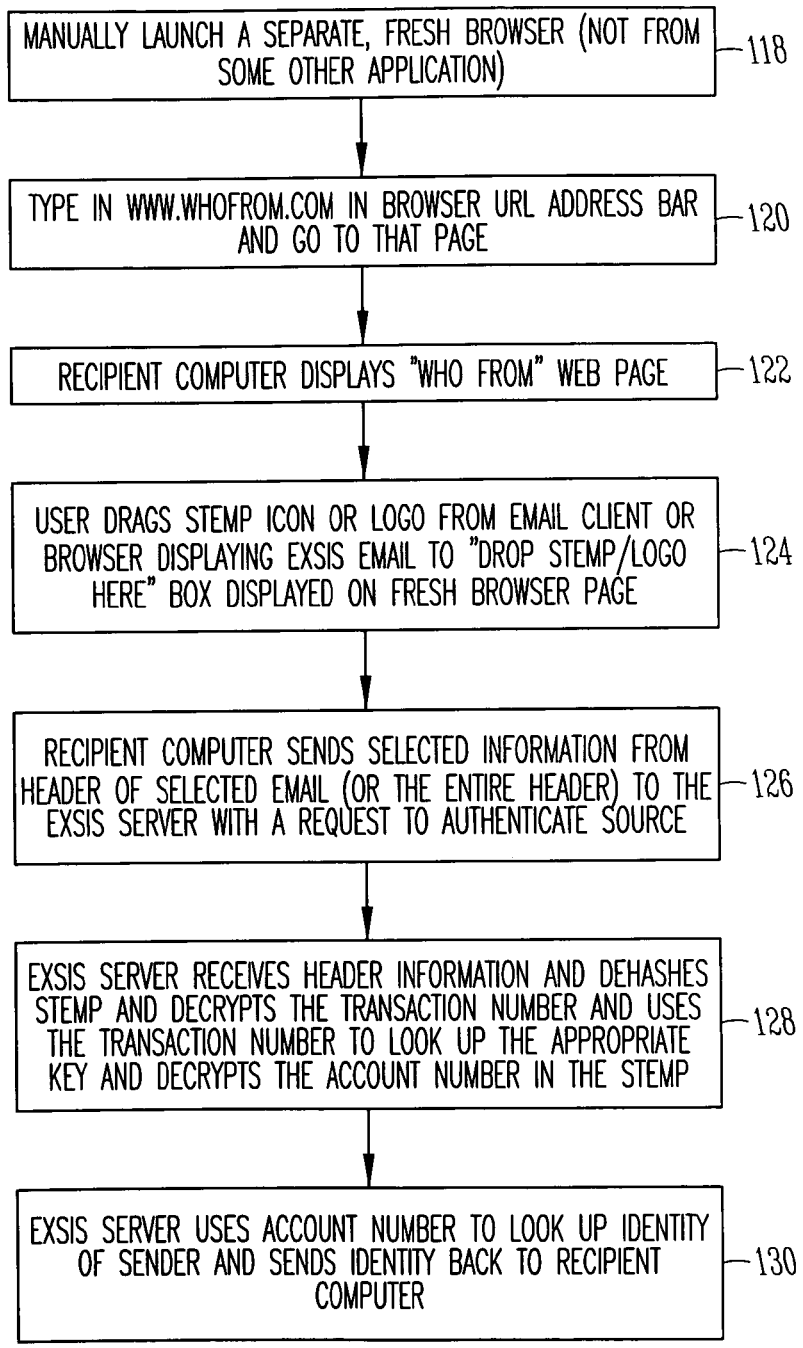
FIG. 7 is a flowchart of the preferred embodiment of a manual authentication process.

FIG. 7 is a flow chart of the manual authentication process of the preferred embodiment. Step 118 represents the process of manually launching a separate, fresh browser window by invoking a browser icon on a desktop or in an applications folder. This browser should not be launched from another application such as a word processor, accounting program, etc.

Step 120 represents the process on the recipient computer of receiving user input to point the browser to URL www-.whofrom.com. Typically, this involves receiving user keystrokes to enter this URL address in the address bar of the fresh instance of a browser and receiving a command to visit that web page. This web page is typically implemented on the Exsis server, but it could be implemented by another server on the internet which has copies of (or shared) Exsis account numbers, decryption keys, and Exsis transaction numbers stored on the Exsis server.

In response to invoking the www.whofrom.com address, the fresh browser instance retrieves the web page and displays it (step 122). This web page has a "drop stemp/Truemark from selected email here" box displayed. The recipient computer then receives input from the user who drags to this box the Truemark or stemp icon from an email displayed in the Exsis folder whose source is to be authenticated (step 124). This causes the recipient computer to send the header or at least the stemp of the header of the selected email to the Exsis server with a request to authenticate the source thereof (step 126).

The reason this particular drag and drop to a web page user interface is preferred is to prevent the user from being victimized by a spoofed stemp linked to a criminal link. The bad guys now have strong ability to use "JAVA®." to paint over any screen, so that the manually entered URL on a fresh browser screen is essential to prevent spoofing. For more on hijacked address bars, see http://www.antiphishing.org/news/03-31-04_Alert-FakeAddressBar.html.

In step 128, the Exsis server receives header information and dehashes the stemp. It then decrypts the transaction number encoded into the stemp and uses that transaction number to look up the decryption key used to encrypt the account number encoded into the stemp. That key is then used to decrypt the account number. Finally, in step 130 the Exsis server uses the decrypted account number to look up the identity of the sender and sends the identity back to the recipient computer.

Figure 8A:
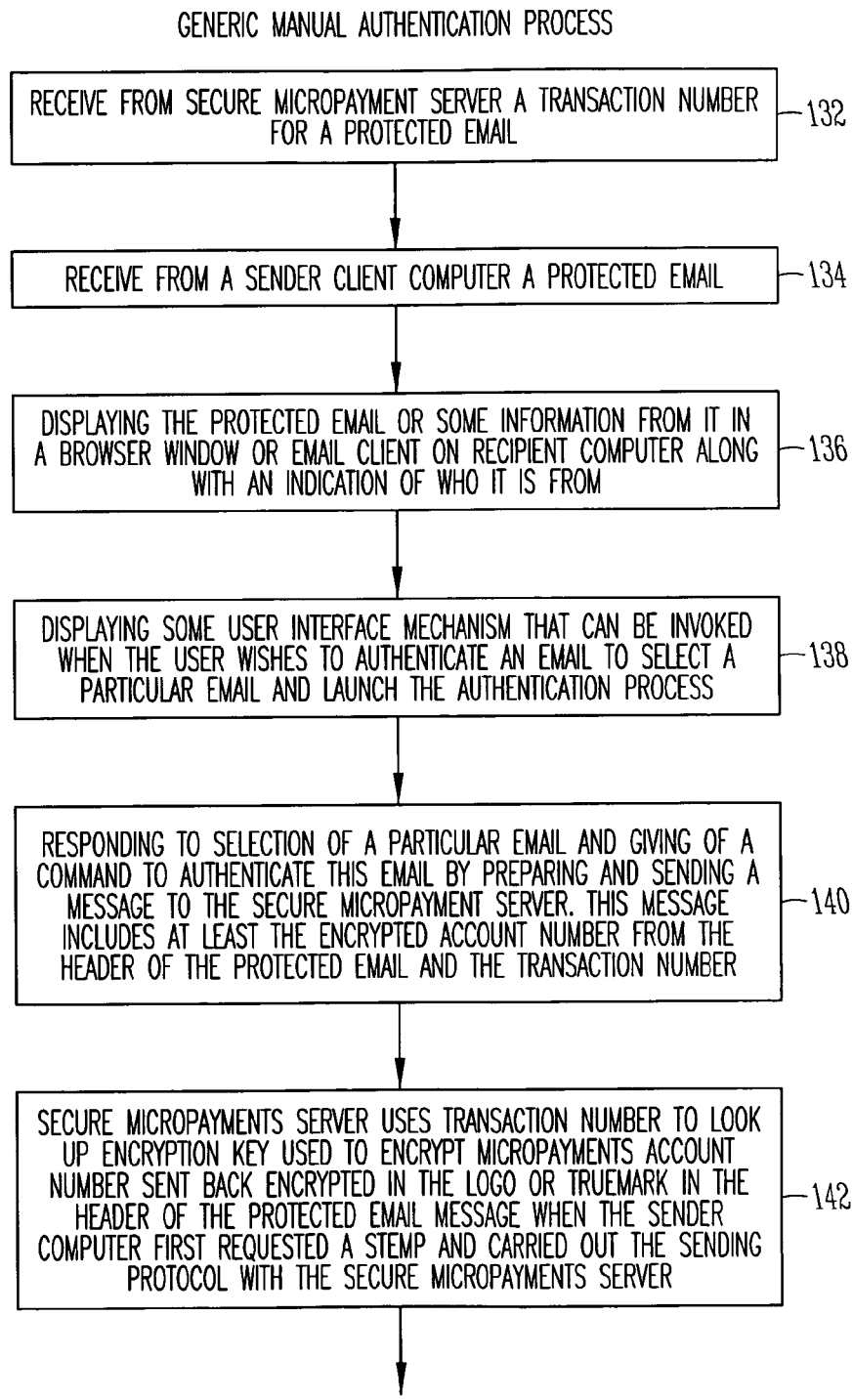
FIG. 8 is a flowchart of a generic manual authentication process.
Figure 8B:
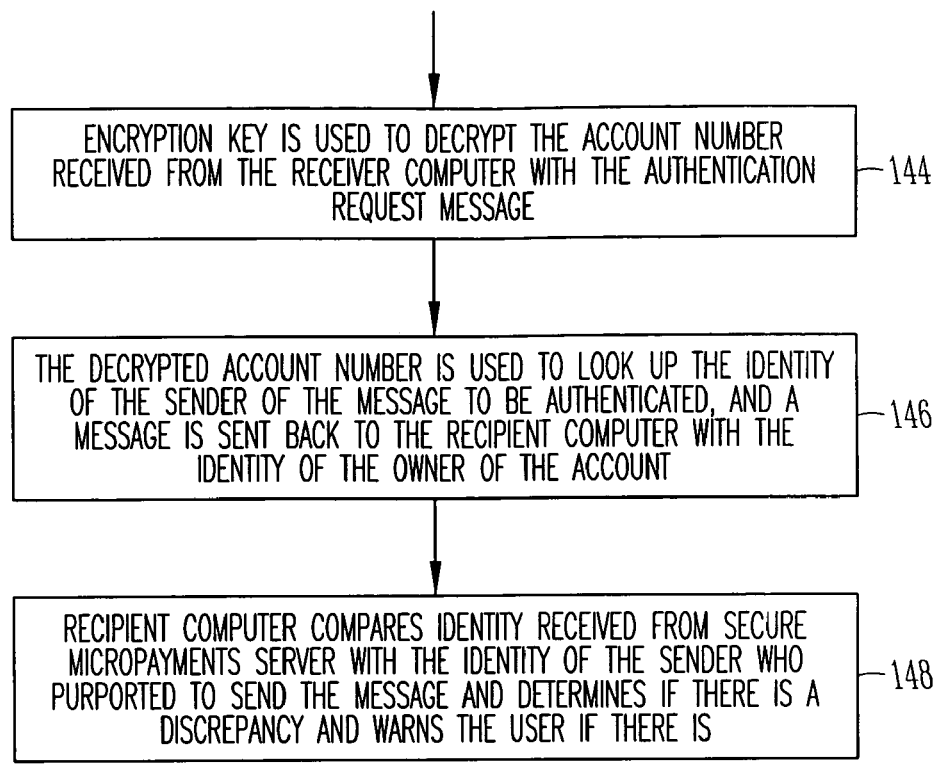

FIG. 7 represents the preferred embodiment of the manual authentication process because of the use of the box and the drag and drop user interface to drag the icon or stemp to the box. A more generic process for manual authentication is symbolized by the flowchart of FIG. 8. Step 132 represents the process of receiving in the receiver client computer 10 a transaction number. This transaction number is sent from the Exsis server 8 in FIG. 1 which is referred to in the claims alternatively as the secure micropayments server or the protected email server. This transaction number is sent to the recipient computer 10 in communication 18 in FIG. 1 after the sender computer has made transmission 14 in FIG. 1 and received back communication 16 there and after the Exsis server has generated the transaction number as a result of communication 14.

Step 134 represents the process of receiving from a sender client computer 2 in FIG. 1 a protected email. This email corresponds to message path 5 in FIG. 1. This protected email is sent after the sender client computer performs any of the sending protocols earlier described with the Exsis server 8 to request a stemp or a code which indicates the server is on the recipient's white list and the server sends back the stemp or code and generates a transaction number which is sent to the recipient computer in the communication labelled 18 in FIG. 1.

Step 136 represents the process of displaying the protected email on the recipient computer with some indication of who it purports to be from. In the preferred embodiment, the recipient computer receives a Truemark or generic logo with the transaction number, and it is this Truemark or generic logo that is displayed along with the name of the sender.

Step 138 represents the process of displaying on the recipient computer some user interface mechanism that the user can invoke to select a particular email and launch the authentication process. It is this manual step which is why this process is called the manual authentication process although most of the work is done by computers. The particular user interface mechanism selected is not important. It can be a single mouse click on a particular email or on the logo of that email followed by selection of a drop down menu command, entry of a hot key combination, or selection of a radio button. Whatever it is, two things must be accomplished, and any mechanism to do these two things will suffice: 1) selection of a particular email; and 2) giving some indication that authentication of its source is desired.

Step 140 represents the process of responding to selection of a particular email and giving of a command to authenticate the email. The recipient computer responds by sending a message to the secure micropayment server requesting authentication of a protected email message identified by information sent in the authentication request message. The authentication request message includes the encrypted micropayments account number from the header of the protected email and the transaction number received from the secure micropayments server. The recipient computer keeps a map or table of which emails correspond to which transaction numbers, and, as a general measure of security, matches the transaction number received from the secure micropayments server with the transaction number encrypted in the truemark or logo of the protected email.

In step 142, the secure micropayments server uses the transaction number to look up the encryption key used to encrypt the secure micropayments account number when the sender computer first requested a stemp and carried out the sending protocol with the secure micropayments server. That encryption key was used to encrypt the account number and transaction number that was embodied in the stemp, Truemark or generic logo sent back to the sender computer after verification that the sender had an account with sufficient money to pay the cost of the stemp or was on the white list.

In step 144, the encryption key is used to decrypt the account number received from the receiver computer with the authentication request message. If the micropayment account number does not decrypt properly, sending a message to the recipient computer that the selected Exsis email is not from who it purports to be from. If the decryption succeeds, proceeding to step 146.

In step 146, the decrypted account number is used to look up the identity of the sender of the message to be authenticated, and a message is sent back to the recipient computer with the identity of the owner of the account.

In step 148, the recipient computer compares the identity received from the secure micropayments server with the identity of the sender who purports to have sent the protected email and determines if there is a discrepancy and warns the user if there is. In some embodiments, the actual sender ID is displayed, and in other embodiments, a message is displayed indicating whether the sender is or is not authentic.

Figure 9A:
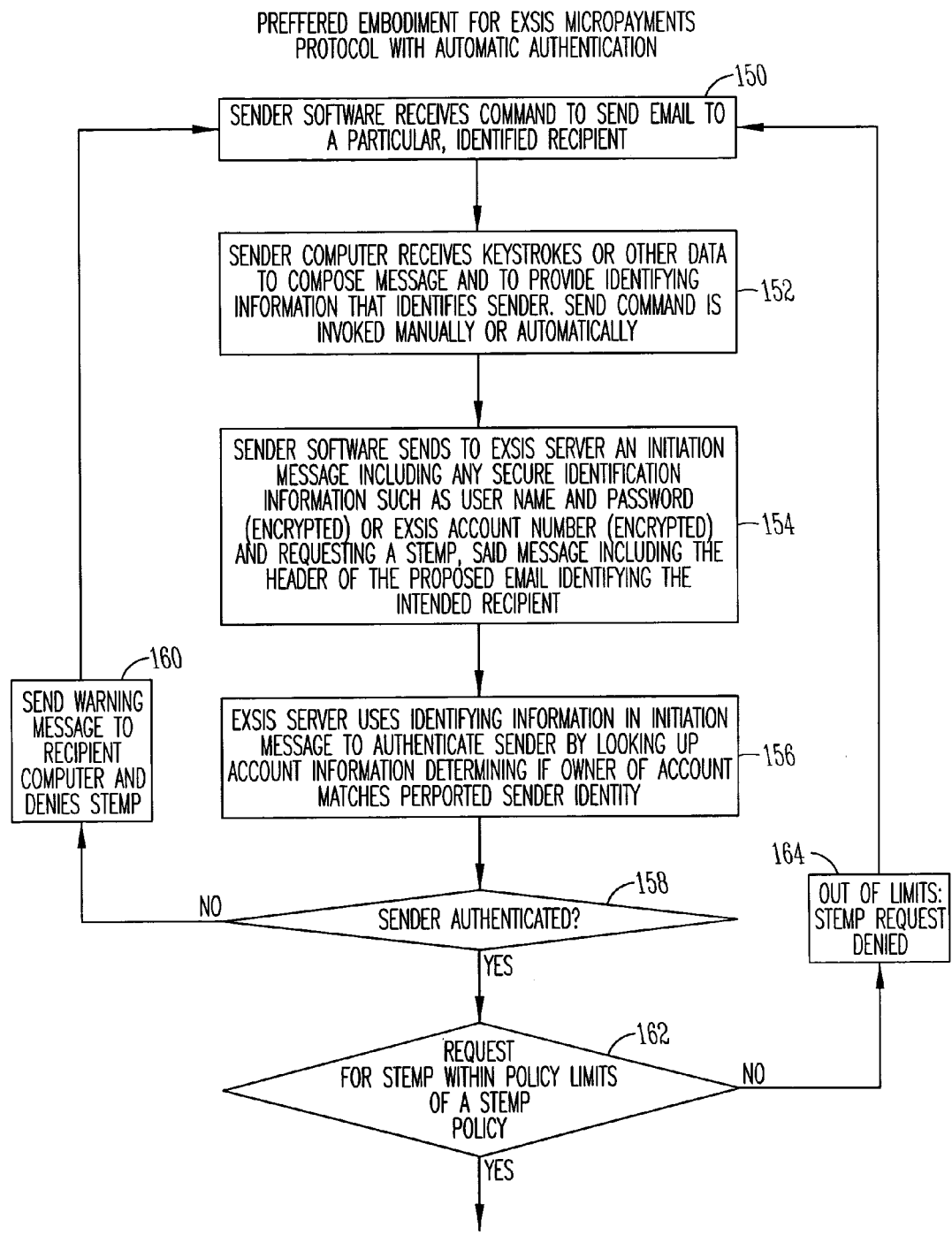
FIG. 9 is a flowchart of the preferred embodiment of a protocol to send and receive protected email.
Figure 9B:
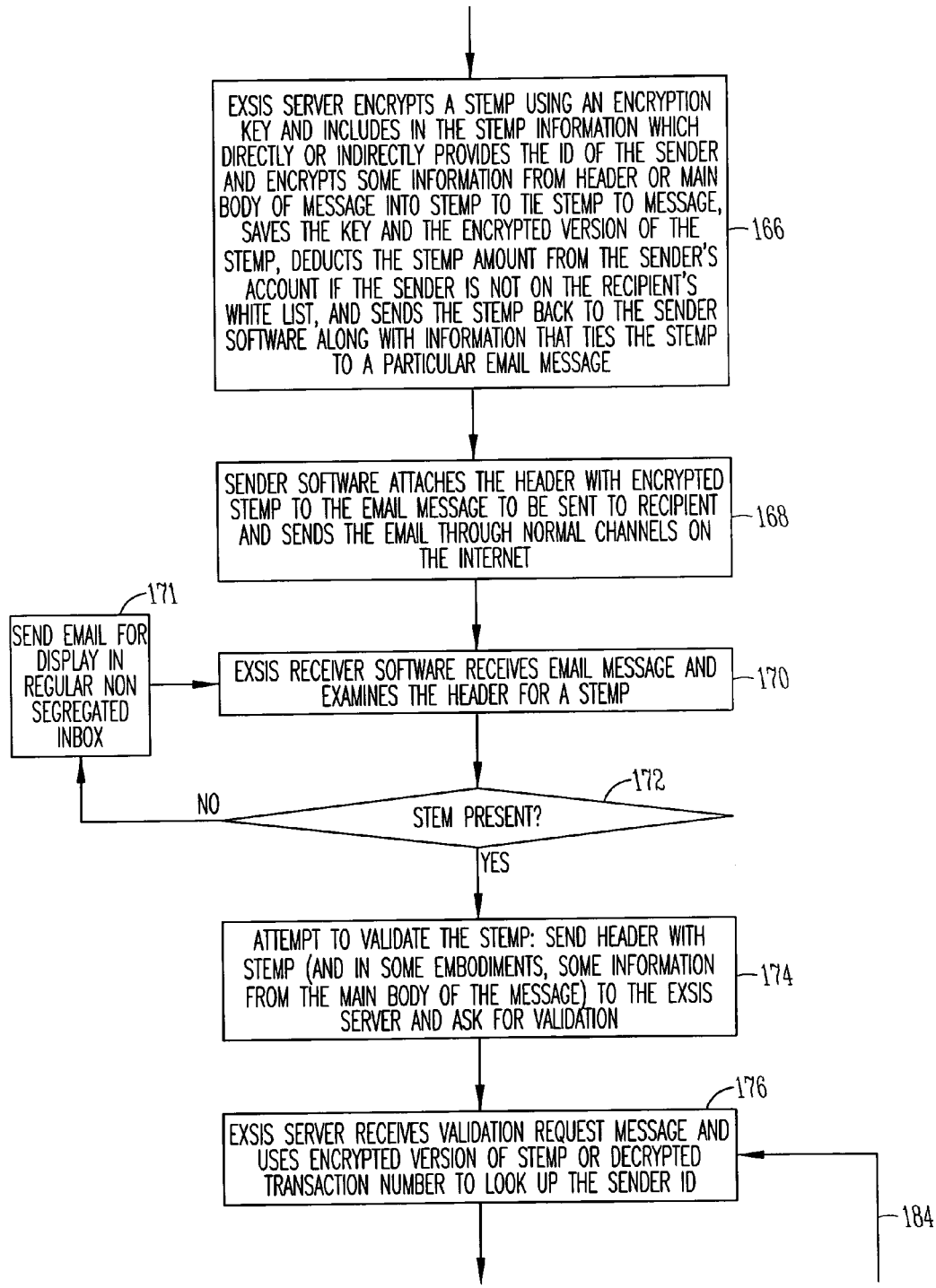
Figure 9C:
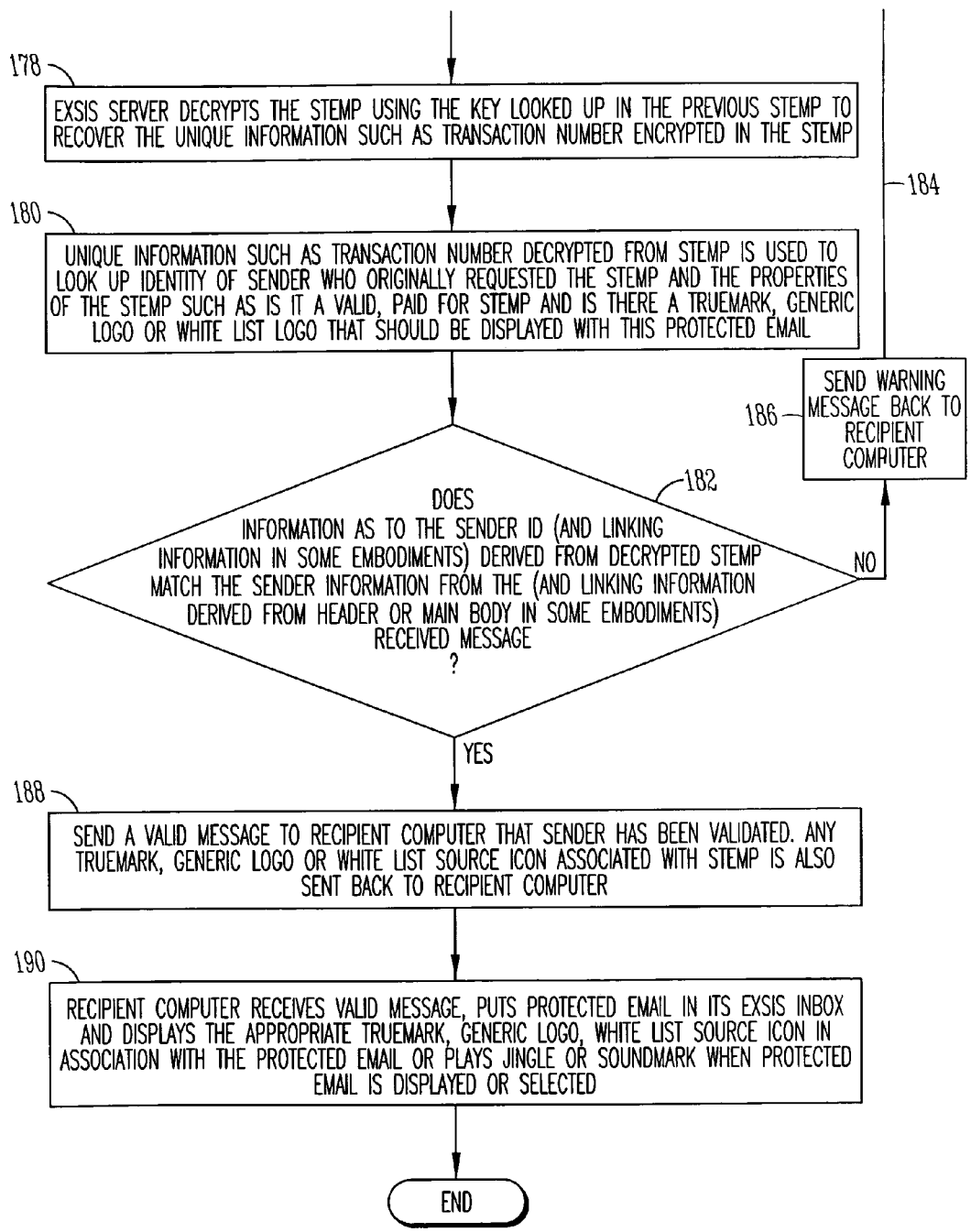

FIG. 9 is a flowchart of the preferred embodiment of a protocol to send and receive protected email. In step 150, the sender software receives a command to send email to a particular, identified recipient. In step 152, the sender software receives keystrokes or other data to compose the email message, identify the intended recipient and supply identifying information that identifies the sender. In the preferred embodiment, the identifying information is a user name and password (encrypted) and some other secure information that only the sender would know and/or to which a phisher would not have access. This other information can be a key that changes over time, a fixed, secret key, or any other secret information only the authentic sender would know such as the micropayments account number, a birthplace or time of birth.

Step 154 represents the process where the sender software sends to the Exsis server an initiation message including any secure identification information such as user name and password and other secure information such as an authentication key or other secret information only the authentic sender possesses. The initiation message requests a stemp, and includes the header of the proposed email which includes information identifying the proposed recipient.

Step 156 represents the process of the Exsis server using the identifying information in the initiation message to authenticate the identity of the sender to verify that the initiation message is from who it purports to be from. This is done by using the identifying information to look up the Exsis account number and then looking up the identity of the client which owns said account number. This identity of the owner of the account is compared to the purported identity of the sender, and, if there is a match, the sender's identity is authenticated. If there is no match, a warning message is generated and sent. It may be sent to the recipient computer, or it may be sent back to the sender computer. In either event, the request for a stemp is denied, all as symbolized by steps 158 and 160. These steps thwart phishers because the phisher will not be in possession of the user name, password and other secret authenticating information that only the authentic senders possess.

Test 162 happens if the sender is authenticated in step 158. If the sender's identity is authenticated, the Exsis server (8 in FIG. 1) determines if the request for a stemp in the initiation message (14 in FIG. 1) is within policy limits of a stemp policy. The stemp policy can be anything, but, in general, it is a policy to thwart high volume spammers such as a limit on the number of stemps that can be issued to one sender in one 24 hour period, or a limit on the dollar volume of stemps that can be issued to one sender in any 24 hour period. If the request is not within the policy limits, step 164 is performed to deny the stemp request and processing returns to step 150. This part of the process defeats any bulk spammer who decides to make the micropayments to send out the spam because the stemp policy will have limits set to bar this type of activity.

If the request for the stemp is within the stemp policy, step 166 is performed. In this step, the Exsis server uses an encryption key and encrypts unique information which directly or indirectly gives the identity of the sender into a stemp. The Exsis server also encrypts some information from the header of the proposed email message (or from the main body of the message in some embodiments where the main body or some portion thereof is sent with the initiation message) into the stemp so as to tie the stemp to the message. The identifying information that identifies the sender can be unique to this stemp or it can be unique to the stemp when considered in the context of other information such as the date, the account number, etc. The important thing is that whatever this unique information is that is encoded into the stemp be such that it directly or indirectly gives the identity of the sender who requested the stemp and that it or the sender's identity can be mapped to a Truemark, generic logo or white list source icon associated with this particular sender.

For example, the identifying information may be a transaction number which is then stored in a table in the Exsis server along with the identity of the sender, the encryption key used and the encrypted version of the stemp and any Truemark, generic logo or white list source icon associated with this particular sender. FIG. 10 is an example of such a table or database which can be used by the Exsis server to map from a transaction number to an identity. Row 165 stores a record for one protected email sent by "FED EX®." Column 167, row 165 stores the transaction number encrypted into a stemp, and column 169, row 165 stores the encryption key used to encrypt the stemp.

In some embodiments, the stemp is multiple layers with a standard key known to the Exsis server used to encrypt the outer layer and a unique session key used to encrypt certain critical information at the next layer such as the sender ID, the sender ID's account number or Truemark, etc. In other words, the stemp may be comprised of a piece of unique information such as a transaction number and sender ID or sender account number data encrypted with a unique session key. The combination of the transaction number and the encrypted sensitive information is then encrypted with the outer layer standard key. In such a case, Column 169 stores the unique session key used to encrypt the sensitive information within the stemp that directly or indirectly points to the sender's identity.

Column 171, row 165 stores the sender ID (in this case "FED EX®.") or the sender's account number or a pointer to the ID of the sender. In some embodiments, this column is omitted, and the sender identity must be looked up in a separate database or table after the transaction number is decrypted from the stemp. Column 173, row 165 stores the encrypted version of the stemp. Column 173, row 165 allows the server to map from encrypted version of a stemp to the key that was used to encrypt it so that the key can be used to decrypt the stemp, retrieve the transaction number and look up the identity of the sender.

In embodiments where some information from the main body is encrypted into the stemp, the preferred method is to follow some predetermined protocol to which all the recipient computers know without being told to extract some information from the main body of the message or develop a hash of all or some of the main body of the message for encryption into the stemp. For example, a predetermined hash function of the recipient email address and the first 10 words of the email main body might be used.

Returning to step 166, FIG. 10 is an example of how the transaction number encrypted or other identifying information encrypted in the stemp and stored in column 167 can, for any particular protected email (row in FIG. 10) indirectly lead to the identity of the sender. After the stemp is encrypted, the transaction number or other identifying information encrypted into the stemp is stored in column 167 of a row of the table or in a corresponding field of a database record represented by FIG. 10. The encryption key is then stored in column 169 of the same row (or a corresponding field of a database record), and the identity of the sender (or his account number or a pointer to his identity) is stored in column 171 of the same row (or a corresponding field of a database record). The encrypted version of the stemp is stored in column 173 of the same row (or a corresponding field of a database record pertaining to this particular protected email). The identity of the sender stored in column 171 is also mapped (often in another table stored in the Exsis server) to an associated source icon so that once the Exsis server determines the identity of the sender, it can immediately determine whether that sender has paid to have a Truemark source icon displayed with its email in the segregated Exsis inbox on the recipient computer or the email is to be displayed with a white list source icon or a generic logo. Column 175 stores the identity of or a pointer to the particular source icon to be displayed with the protected email on the recipient computer's display of the contents of the Exsis inbox. In the case of row 165, "FED EX®." has paid to have its "FED EX®." icon displayed in the Exsis inbox with its email for better brand identification. Accordingly, row 165, column 175 stores the identity of the "FED EX®." Truemark or a pointer to its storage location. In the case of row 177, this protected email is from a white list member of the intended recipient. Accordingly, column 175 stores a pointer to or the identity of the white list source icon for display with the email from sender Bobbie White on the recipient computer's display of the contents of the Exsis inbox.

The Exsis server then checks to determine if the sender is on a white list of the intended recipient, and, if so sends the encrypted stemp to the sender without deducting a micropayment amount from the sender's Exsis account. If the sender is not on a white list of the intended recipient, the Exsis server deducts the micropayment amount from the sender's Exsis account and sends the encrypted stemp back to the sender.

The stemp is sent back to the sender in step 166 along with information that ties this particular stemp to this particular email message. Typically, this is done by encrypting part of the original header sent to the Exsis server into the stemp so as to tie the stemp to the original message for which it was generated. The Exsis server then sends the whole header back to the sender along with the stemp. This prevents the theft of the stemp and use on a false message from a phisher.

In step 168, the sender software attaches the header with the encrypted stemp received from the Exsis server to the email and sends the email through regular channels to the recipient.

In step 170, the recipient computer's receiver software 12 receives the email from the sender and examines the header of the email for the presence of a stemp. If test 172 determines that no stemp is present, the email is directed in step 171 to the regular non protected email client process on the recipient computer for display in the regular, non segregated inbox. Examples of such non protected email client processes or applications are "NETSCAPE®." Communicator's Messenger module, "OUTLOOK EXPRESS®." and many other email clients.

In step 174, the recipient computer's Exsis receiver software process attempts to validate the stemp. This is done by sending the header of the received message back to the Exsis server. This step is done automatically in some embodiments, or manually by giving the validation command after selecting a particular email in the preferred embodiment. In some embodiments some predetermined portion of the main body of the received message is also sent back to the Exsis server or a predetermined hash thereof is sent back to the server. The purpose of sending some information from the main body back is to provide information the Exsis server needs to verify that the stemp in the header was attached to the original message for which it was requested and not diverted to some other email message. Therefore, the part of the main body sent back to the Exsis server with the request to validate the stemp needs to be the same part which the Exsis server originally encrypted into the stemp in the first place. Not all embodiments require part of the main body to be sent back with the header. In some embodiments, the recipient computer can figure out the key needed to decrypt the stemp and decrypt the stemp and validate it without sending the stemp back to the Exsis server. In such the embodiments, the same key may be used to encrypt every stemp, or some predetermined algorithm known to both the recipient computer and the Exsis server may be used to generate the key from some information in the header and/or main body of the message itself.

The process to validate the stemp is an attempt by the receiver software process to answer three questions: 1) is the stemp a valid, paid for stemp? 2) is the sender of this email who he claims to be? and 3) is there any associated logo, jingle or other information to be displayed/played to the user which maps to this message?

In step 176, the Exsis server receives the validation request and uses the encrypted version of the stemp or the decrypted transaction number to search a database or table such as that shown in FIG. 10 to find the unique session key used to encrypt the sender ID information encrypted into the stemp. In the case of a single level stemp, with one unique session key used to encrypt all the data in the stemp, step 176 represents using the encrypted version of the stemp to search the table or database to find the record which pertains to this particular protected email. That record can then be searched for the rest of the information the sender needs. In the case of a multiple level stemp, the Exsis server uses the standard key to decrypte the first layer of the stemp to extract the transaction number. This transaction number is then used to search the database or table to find the record that pertains to this particular email. That record is then searched to In step 178, this key is used to decrypt the stemp to recover the unique information (hereafter referred to as the transaction number) encrypted into the stemp that directly or indirectly gives the identity of the sender.

In step 180, the unique information such as the transaction number which is decrypted from the stemp is used to look up the identity of the sender who originally requested the stemp. The transaction number is also used to look up the properties of the stemp such as whether it is a valid, paid for stemp and whether there is a Truemark, generic logo, jingle or white list logo that is associated with this transaction number. This can be determined by checking the appropriate row and column 175 of the table in the Exsis server and represented by FIG. 10.

In step 182, the Exsis server determines whether the sender ID information derived by decrypting the stemp matches the ID of the sender who sent the message the recipient computer received. In some embodiments, the server also decrypts linking information from the stemp, and determines if the linking information from the header and/or main body which was encrypted into the stemp and which ties the stemp to a particular message matches the appropriate information from the header and/or main body of the message received by the recipient computer and which caused said validation request message to be sent. If all comparisons indicate a match, the sender is validated, and processing proceeds to step 188 where a message that the sender has been validated is sent back to the recipient computer. This message includes any Truemark, generic logo or white list source icon that needs to be displayed in the Exsis inbox for this email or any jingle or soundmark that needs to be played when the email is displayed in the Exsis inbox.

If one or more of the comparisons indicates a mismatch, processing proceeds to step 186 where a warning message is sent back to the recipient computer indicating the message is not from who it purports to be from.

In step 190, the recipient computer receives the valid message and puts the protected email in its Exsis inbox and displays the appropriate Truemark, generic logo or white list source icon received with the valid message from the Exsis server. This Truemark, generic logo or white list source icon is displayed in the Exsis inbox with the protected email indicating to the user the source of the email has been validated. If a jingle or sound mark is associated with the protected email, that jingle or soundmark is played to the user when the protected email is first displayed or is selected by the user.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. In a recipient computer system having a graphical user interface including a display and a selection device, a method of segregating paid emails and white list emails from other emails on the display, the method comprising:
   A) displaying a navigation pane and a content pane in a browser or an email client application window;
   B) retrieving and displaying in the navigation pane a set of navigation icons including a paid email icon representing an inbox in which the paid emails and the white list emails are displayed and an inbox icon representing a different inbox in which all the other emails which are not the paid emails or the white list emails are displayed;
   C) receiving a selection signal when a particular icon in the navigation pane is selected with the selection device;
   D) when the selection signal indicates the paid email icon has been selected, responding to the selection signal by populating the content pane with selected Exsis emails which include in a header of each selected Exsis email, data indicating a micropayment was already made for purposes of sending the selected Exsis email or which indicates the sender of the selected Exsis email is on a white list of the recipient; and
   E) when the selection signal indicates the inbox icon has been selected, responding to the selection signal by displaying a different content pane in which unpaid emails that are not from a particular sender that which is on a white list of the recipient are displayed.

2. The method of claim 1 wherein step D further comprises simultaneously displaying in a single content pane both the paid emails and the white list emails interspersed with one another within the single content pane.

3. The method of claim 2 wherein step A comprises displaying a split content pane comprised of first and second panes, and wherein step D comprises populating the first pane with a current date's Exsis white list emails and a current date's Exsis paid emails interspersed together, and populating the second pane with a day before the current date's white list and paid Exsis emails.

4. The method of claim 1 wherein step A further comprises displaying a split content pane with two distinct portions thereof and wherein step D further comprises simultaneously displaying in the split content pane both the paid emails and the white list emails with the paid emails being displayed in one portion of the split content pane and the white list emails being displayed in another portion of the split content pane.

5. The method of claim 4 wherein step A comprises displaying third and fourth panes of said first pane of said split content pane and displaying fifth and sixth panes of said second pan, and wherein step D comprises populating said third pane with a current date's Exsis white list emails and populating said fourth pane with a day before the current date's white list emails and populating said fifth pane of said second pane with the current date's paid Exsis emails and populating said sixth pane of said second pane with the day before the current date's paid Exsis emails.

6. The method of claim 1 wherein step D further comprises displaying a Truemark logo with each Exsis email from a particular sender who has paid extra to have that sender's company logo displayed in miniature as a source icon, but displaying the Truemark just for those Exsis emails which have already been authenticated and which have already been paid extra for in order to have a Truemark type source icon.

7. The method of claim 6 further comprising the following steps carried out in a sender computer coupled to a protected email server and to a recipient computer system via a wide area network (WAN):

D-1 at the sender computer, receiving data from the particular sender to compose a proposed email message and receiving a user command to send the proposed email message to a particular recipient;

D-2 sending a request message to a protected email server requesting a code in a form of a stemp for inclusion in a particular header of the proposed email and passing information with the request message which identifies the particular sender;

D-3 at the protected email server, authenticating an identity of the particular sender using the information from the request message and verifying the particular sender has an account with sufficient money in that account to pay for the code requested in step D-2 and is not on a black list or an opt out list of the recipient or that the particular sender is on a particular white list of the recipient;

D-4 at the protected email server, when conditions in step D-3 are proper to send the proposed email, the protected email server: generates a transaction number, encrypts the stemp that contains the identification of the particular sender and the transaction number, saves an encryption key, deducts an amount of the micropayment from the account of the particular sender if the particular sender is not on the white list of the recipient, sends back to the particular sender the proposed email message header with the stemp encoded therein;

D-5 wherein the protected email server sends the encryption key used in step D-4 and the transaction number generated in step D-4 and a Truemark or generic logo identifying the particular sender of the proposed email message associated with the transaction number to the recipient computer system operated by the recipient;

D-6 at said sender computer, attaching the header received from the protected email server to the proposed email message and sending the proposed email message to the recipient computer system via the WAN and other normal email sending processes;

D-7 at the recipient computer system, receiving the encryption key, the transaction number and the Truemark or the generic logo from the protected email server;

D-8 at the recipient computer, receiving the proposed email message sent by the sender computer, and responding thereto by retrieving the encryption key used to encrypt the stemp and attempting to decrypt the stemp to retrieve the account number and the transaction number encrypted therein; and D-9 if the stemp decrypts properly and the decrypted transaction number matches the transaction number received from the protected email server, the recipient computer places the proposed email message in a segregated inbox folder and stores an appropriate Truemark or generic logo with the proposed email message for display when the recipient gives a command to display contents of the segregated inbox folder and the particular sender has been authenticated.

8. The method of claim 1 wherein step D further comprises:

displaying a friend content pane which has a friend's tab and a logo mail tab each of which can be selected by the selection device; and receiving a different selection signal which indicates whether the friend's tab or the logo mail tab has been selected;

if the different selection signal indicates the friend's tab has been selected, responding thereto by displaying in the friend content pane just Exsis emails that have data in their headers which indicates those Exsis emails originated from a particular sender which is on the white list of the recipient;

if the different selection signal indicates the logo mail tab has been selected, responding thereto by displaying in the friend content pane just Exsis emails that have data in the headers indicating micropayments have been made to send those particular Exsis emails.

9. The method of claim 1 wherein step A comprises displaying a split content pane, and wherein step D comprises populating a first pane of the split content pane with a current date's Exsis emails and populating a second pane of the split content pane with a day before the current date's Exsis emails.

10. The method of claim 1 wherein step A comprises displaying a split content pane, with a first pane displaying a current date's Exsis white list emails and a second pane displaying a day before the current date's white list emails when a friends tab is selected, and, when a logo mail tab is selected, the first pane displays the current date's paid Exsis emails and the second pane displays the day before the current date's paid Exsis emails.

11. The method of claim 1 wherein step D further comprises displaying a source icon with each Exsis email a presence of which indicates at least that a particular email can be authenticated as to that particular email's source or already has been automatically authenticated as to that particular email's source, and wherein a particular type of source icon displayed gives a visual indication as to whether that particular email is from a white list member designated by the recipient to be able to send free emails to the recipient for free or is from a company or an individual who has paid a subscription to have a company's or an individual's emails segregated into the Exsis inbox and to have a miniature replica of that company's or that individual's logo, called a Truemark type source icon, displayed as the source icon, or is from a different company or a different individual who did not pay a subscription to have that different company's or that different individual's logo displayed as a Truemark type source icon but did make a micropayment to have that different company's or that different individual's email segregated away from other spam in the Exsis inbox.

12. In a recipient computer system having a graphical user interface including a display and a selection device, a method of segregating paid emails and white list emails from other emails on the display, the method comprising:

A) displaying a navigation pane and a split content pane in a browser or email client application window, the split content pane having a first pane and a second pane, and displaying a friends tab and a logo mail tab associated with the split content pane;

B) retrieving and displaying in the navigation pane a set of navigation icons including an Exsis email icon representing a paid inbox in which the paid emails and the white list emails are displayed and an inbox icon representing a different inbox in which all the other emails which are not the paid emails or the white list emails are displayed;

C) receiving a selection signal when a particular in the navigation pane is selected with the selection device;

D) when the selection signal indicates the Exsis email icon has been selected and another selection signal indicating the logo mail tab has been selected, responding to the selection signals by populating the first pane of the content pane with paid Exsis emails from a current date and populating the second pane with paid Exsis emails from a day before the current date, the paid Exsis emails including in a header of each of the paid Exsis emails, data indicating a micropayment was made for sending the paid Exsis email;

E) when the selection signal indicates said Exsis email icon has been selected and another selection signal indicating the friends tab has been selected, responding to said selection signals by populating the first pane of the content pane with white list Exsis emails from the current date and populating said second pane with white list Exsis emails from the day before the current date, the white list Exsis emails including in a header of each of the white list Exsis emails, data indicating a sender is on a white list of a recipient; and F) when the selection signal indicates the inbox icon has been selected, responding to said selection signal by displaying a different content pane in which the other emails are displayed, and wherein the other emails have not been not paid for and are not from a particular sender identified within the white list of the recipient.

13. The method of claim 12 further comprising the following steps carried out in a sender computer coupled to a protected email server and to a recipient computer system via a wide area network (WAN):

G) at the sender computer, receiving data from the sender to compose a proposed email message and receiving a sender command to send the proposed email message to a particular recipient;

H) sending a request message to the protected email server requesting a code in the form of a stemp for inclusion in a header of the proposed email message and passing information with the request message which identifies the sender;

I) at the protected email server, authenticating an identity of the sender using the information from the request message and verifying the sender has an account with sufficient money in the account to pay for the code requested in step H and is not on a black list or an opt out list of the particular recipient or that the sender is on the white list of the recipient;

J) at the protected email server, when conditions in step I are proper to send the proposed email message, the protected email server: generates a transaction number, encrypts the stemp which contains the identity of the sender and the transaction number, saves an encryption key, deducts an amount of the micropayment from the account of the sender if the sender is not on the white list of the recipient, and sends back to the sender the header with the stemp encoded therein;

K) wherein the protected email server sends the encryption key used in step J and the transaction number generated in step J and sends a Truemark or a generic logo associated with the transaction number, to the recipient computer system operated by the particular recipient;

L) at the sender computer, attaching the header received from the protected email server to the proposed email message and sending the proposed email message to the recipient computer system via the WAN and other normal email sending processes;

M) at the recipient computer system, receiving the encryption key, the transaction number and the Truemark or the generic logo from the protected email server;

N) at the recipient computer, receiving the proposed email message sent by the sender computer, and responding thereto by retrieving the encryption key used to encrypt the stemp and attempting to decrypt the stemp to retrieve the account number and transaction number encrypted therein; and O) if the stemp decrypts properly and the decrypted transaction number matches the transaction number received from the protected email server, the recipient computer places the proposed email message in a segregated inbox folder and stores an appropriate Truemark or generic logo associated with the transaction number for display when the sender gives another command to display contents of the segregated inbox folder.

14. In a recipient computer system having a graphical user interface including a display and a selection device, a method of segregating paid emails and white list emails from other emails on the display, the method comprising:

A) displaying a navigation pane and a content pane in a browser or email client application window;

B) retrieving and displaying in the navigation pane a set of navigation icons including a paid email icon representing a segregated inbox in which the paid emails and the white list emails are displayed and an inbox icon representing an inbox in which the other emails that are not the paid emails and are not the white list emails are displayed;

C) receiving a selection signal when a particular icon in the navigation pane is selected with the selection device;

D) when the selection signal indicates the paid email icon has been selected, responding to the selection signal by populating the content pane with selected Exsis emails which include in a header of each said selected Exsis email, data indicating a micropayment was made to send a particular email or which indicates a sender of the particular email is on a white list of a recipient;

E) when the selection signal indicates the inbox icon has been selected, responding to the selection signal by displaying a content pane in which the other emails that are not paid for and are not from a particular sender which is on the white list of the recipient;

F) displaying a user interface mechanism which provides an ability for a user of the recipient computer system to select a particular Exsis email in the segregated inbox and provide an option to give a command to authenticate that particular Exsis email;

G) responding to a given selection of the particular Exsis email and giving of another a command to authenticate the particular Exsis email by preparing and sending an authentication request message to a protected email server which includes at least an encrypted micropayment account number and a transaction number, both the transaction number and the encrypted micropayment account number being extracted from the particular Exsis email via a header associated therewith; and H) receiving a different message back from the protected email server which includes either an identity of the sender of the particular Exsis email or an indication that the sender is or is not from who it purports to be from.

15. The method of claim 14 further comprising the following steps carried out in a protected email server coupled to said recipient computer:

I) receiving the authentication request message from the recipient computer containing the encrypted micropayment account number and the transaction number;

J) using the transaction number to look up an encryption key used to encrypt the micropayment account number which was encrypted in a stemp in the header which was sent back to a sender computer which requested a micropayment transaction to send the particular Exsis email;

K) using the encryption key to attempt to decrypt the encrypted micropayment account number received from the recipient computer with the authentication request message;

L) if the encrypted micropayment account number does not decrypt properly, sending a different message to the recipient computer indicating that the Exsis email is not being sent from who it purports to be sent from;

M) if the encrypted micropayment account number does decrypt properly, using the micropayment account number to look up the identity of the sender of the particular Exsis email; and N) sending an information message to the recipient computer system containing the identity of the sender of the particular Exsis email or containing an indication that the particular Exsis email is authenticated and is being sent from whom it purports to be sent from.

16. In a recipient computer system having a graphical user interface including a display and a selection device, a method of segregating paid emails and white list emails from other emails on the display, the method comprising:

A) displaying a navigation pane and a content pane in a browser or email client application window;

B) retrieving and displaying in the navigation pane a set of navigation icons including a paid email icon representing a segregated inbox in which the paid emails and the white list emails are displayed and an inbox icon representing an inbox in which the other emails that are not the paid emails and that are not the white list emails are displayed;

C) receiving a selection signal when a particular icon in the navigation pane is selected with the selection device;

D) when the selection signal indicates the paid email icon has been selected, responding to the selection signal by populating the content pane with selected Exsis emails which include a header in each of the selected Exsis emails, data indicating a micropayment was made to send the selected Exsis email or which indicates a sender of the selected Exsis email is on a white list of a recipient;

E) when the selection signal indicates the inbox icon has been selected, responding to the selection signal by displaying a different content pane in which the other emails that have not been paid for and which are not on the white list of the recipient are displayed;

F) displaying a user interface mechanism which provides an ability for a user of a recipient computer system to select a particular Exsis email in the segregated inbox and provide an option to give a command to opt out of receiving any more Exsis emails from a source of the particular Exsis email; and G) responding to a particular selection of the particular Exsis email and giving of a different command to opt out by preparing and sending an opt out request message to a protected email server which includes at least an encrypted micropayment account number and a transaction number, both the transaction number and the encrypted micropayment account number being extracted from a header of the particular Exsis email.

17. The method of claim 16 further comprising the following steps carried out in the protected email server coupled to the recipient computer:

H) receiving the opt out request message from the recipient computer containing the encrypted micropayment account number and the transaction number;

I) using the transaction number to look up an encryption key used to encrypt the micropayment account number which was encrypted in a stemp in the header which was sent back to a sender computer and which requested a micropayment transaction to send the particular Exsis email;

J) using the encryption key to attempt to decrypt the encrypted micropayment account number received from the recipient computer with the authentication request message;

K) if the encrypted micropayment account number does not decrypt properly, sending a message to the recipient computer that the particular Exsis email is not being sent from who it purports to be from;

L) if the encrypted micropayment account number does decrypt properly, using the micropayment account number to look up an identity of the sender of the particular Exsis email; and N) adding the identity of the sender to an opt out list maintained on the protected email server for the recipient of the particular Exsis email.

* * * * *

UNITED STATES PATENT AND TRADEMARK OFFICE
CERTIFICATE OF CORRECTION

PATENT NO. : 7,413,085 B2
APPLICATION NO. : 10/935260
DATED : August 19, 2008
INVENTOR(S) : Zager et al.

It is certified that error appears in the above-identified patent and that said Letters Patent is hereby corrected as shown below:

In column 25, line 24, in Claim 5, after "second" delete "pan," and insert -- pane, --, therefor.

In column 29, line 15, in Claim 14, after "another" delete "a".

In column 29, line 44, in Claim 15, after "the" insert -- particular --.

In column 30, line 59, in Claim 17, before "adding" delete "N)" and insert -- M) --, therefor.

Signed and Sealed this

Twenty-eighth Day of October, 2008

JON W. DUDAS
*Director of the United States Patent and Trademark Office*